DIVIDING COMPUTER

Filed Feb. 8, 1961 13 Sheets-Sheet 1

INVENTORS
ROBERT C. JACKSON
WILLIAM A. FLORAC
WAYNE D. WINGER
BY
Carl C. Kling
ATTORNEY

FIG. 2

ADDRESS UNITS DIGIT (columns); ADDRESS TEN-THOUSANDS, THOUSANDS, HUNDREDS, TENS DIGITS (rows)

| | 0 | 1 | 2 | 3 | 4 | 5 | 6 | 7 | 8 | 9 |
|---|---|---|---|---|---|---|---|---|---|---|
| 0030 | 0 | 1 | 2 | 3 | 4 | 5 | 6 | 7 | 8 | 9 |
| 0031 | 1 | 2 | 3 | 4 | 5 | 6 | 7 | 8 | 9 | 0! |
| 0032 | 2 | 3 | 4 | 5 | 6 | 7 | 8 | 9 | 0! | 1! |
| 0033 | 3 | 4 | 5 | 6 | 7 | 8 | 9 | 0! | 1! | 2! |
| 0034 | 4 | 5 | 6 | 7 | 8 | 9 | 0! | 1! | 2! | 3! |
| 0035 | 5 | 6 | 7 | 8 | 9 | 0! | 1! | 2! | 3! | 4! |
| 0036 | 6 | 7 | 8 | 9 | 0! | 1! | 2! | 3! | 4! | 5! |
| 0037 | 7 | 8 | 9 | 0! | 1! | 2! | 3! | 4! | 5! | 6! |
| 0038 | 8 | 9 | 0! | 1! | 2! | 3! | 4! | 5! | 6! | 7! |
| 0039 | 9 | 0! | 1! | 2! | 3! | 4! | 5! | 6! | 7! | 8! |

FIG. 3

ADDRESS UNITS DIGIT (columns); ADDRESS TEN-THOUSANDS, THOUSANDS, HUNDREDS, TENS DIGITS (rows)

| | 0 | 1 | 2 | 3 | 4 | 5 | 6 | 7 | 8 | 9 |
|---|---|---|---|---|---|---|---|---|---|---|
| 0010 | 0 | 0 | 0 | 0 | 0 | 0 | 0 | 0 | 0 | 0 |
| 0011 | 0 | 0 | 0 | 0 | 2 | 0 | 3 | 0 | 4 | 0 |
| 0012 | 0 | 0 | 2 | 0 | 4 | 0 | 6 | 0 | 8 | 0 |
| 0013 | 0 | 0 | 3 | 0 | 6 | 0 | 9 | 0 | 2 | 1 |
| 0014 | 0 | 0 | 4 | 0 | 8 | 0 | 2 | 1 | 6 | 1 |
| 0015 | 0 | 0 | 5 | 0 | 0 | 1 | 5 | 1 | 0 | 2 |
| 0016 | 0 | 0 | 6 | 0 | 2 | 1 | 8 | 1 | 4 | 2 |
| 0017 | 0 | 0 | 7 | 0 | 4 | 1 | 1 | 2 | 8 | 2 |
| 0018 | 0 | 0 | 8 | 0 | 6 | 1 | 4 | 2 | 2 | 3 |
| 0019 | 0 | 0 | 9 | 0 | 8 | 1 | 7 | 2 | 6 | 3 |
| 0020 | 0 | 0 | 0 | 0 | 0 | 0 | 0 | 0 | 0 | 0 |
| 0021 | 5 | 0 | 6 | 0 | 7 | 0 | 8 | 0 | 9 | 0 |
| 0022 | 0 | 1 | 2 | 1 | 4 | 1 | 6 | 1 | 8 | 1 |
| 0023 | 5 | 1 | 8 | 1 | 1 | 2 | 4 | 2 | 7 | 2 |
| 0024 | 0 | 2 | 4 | 2 | 8 | 2 | 2 | 3 | 6 | 3 |
| 0025 | 5 | 2 | 0 | 3 | 5 | 3 | 0 | 4 | 5 | 4 |
| 0026 | 0 | 3 | 6 | 3 | 2 | 4 | 8 | 4 | 4 | 5 |
| 0027 | 5 | 3 | 2 | 4 | 9 | 4 | 6 | 5 | 3 | 6 |
| 0028 | 0 | 4 | 8 | 4 | 6 | 5 | 4 | 6 | 2 | 7 |
| 0029 | 5 | 4 | 4 | 5 | 3 | 6 | 2 | 7 | 1 | 8 |

March 8, 1966 R. C. JACKSON ETAL 3,239,654

DIVIDING COMPUTER

Filed Feb. 8, 1961 13 Sheets-Sheet 4

March 8, 1966 R. C. JACKSON ETAL 3,239,654

DIVIDING COMPUTER

Filed Feb. 8, 1961 13 Sheets-Sheet 6

March 8, 1966 R. C. JACKSON ETAL 3,239,654

DIVIDING COMPUTER

Filed Feb. 8, 1961 13 Sheets-Sheet 7

ADD

MULTIPLY

March 8, 1966 R. C. JACKSON ETAL 3,239,654

DIVIDING COMPUTER

Filed Feb. 8, 1961 13 Sheets-Sheet 8

FIG. 9 LINEUP

FIG. 10 LINEUP DECISIONS

March 8, 1966 R. C. JACKSON ETAL 3,239,654

DIVIDING COMPUTER

Filed Feb. 8, 1961 13 Sheets-Sheet 11

SUBTRACT DECISIONS

ADD BACK DECISIONS

United States Patent Office 3,239,654
Patented Mar. 8, 1966

3,239,654
DIVIDING COMPUTER
Robert C. Jackson, Poughkeepsie, William A. Florac, Carmel, and Wayne D. Winger, Poughkeepsie, N.Y., assignors to International Business Machines Corporation, New York, N.Y., a corporation of New York
Filed Feb. 8, 1961, Ser. No. 87,908
9 Claims. (Cl. 235—159)

SECTION A—INTRODUCTION

The invention relates to a digital computer, and more particularly to a low cost, memory-centered dividing computer.

Prior art digital computers generally divide by reduction of the divisor from a portion of the dividend, by over-and-over subtraction in "adders," with counting of the required subtractions to form each quotient digit, followed by a shift. Each quotient digit is developed in a quotient counter by stepping the counter for each subtraction; the counter digit content is transferred to the quotient register which accumulates the quotient digits.

Small business and scientific organizations have indicated a need for a stored program computer which can handle complex scientific and business divisions, at a reasonable speed, and with a low investment in the machine cost. These organizations require dividing ability and accuracy comparable to that of a giant computer, but simply cannot afford the giant computer. Since sacrifice of dividing ability is not acceptable, sacrifice of speed must be depended upon for the cost reduction which is mandatory. Accurate and dependable low speed electronic components are not sufficiently cheaper than equivalent standard components to accomplish effective cost reduction by direct substitution of cheaper components in any known prior art computer design.

This invention presents a novel approach to division. It eliminates whole sections of standard computer subassemblies, accomplishing the same final result less speedily but with greatly reduced machine investment. Subassemblies accomplish multiple functions, each sub-assembly assisting in as many functions as possible.

Prior digital computers may generally be described as serial or parallel, depending upon the handling of multi-digit words during arithmetic operations. For example, a parallel computer generally adds by storing the augend in a multi-order accumulator, and superimposing the addend onto the value stored in the accumulator. Carries are handled together at a later or carry time or by extensive carry prediction logic. A serial computer generally adds by placing addend and augend in registers, and concurrently shifting out the digit values of equal orders of the registers, through an adder, into an accumulator. The adder accepts the augend digit value and the addend digit value as inputs, and stores the carry which is delayed one digit cycle and then fed back to the adder. On the following cycle, the carry is a third input with the next higher digit order values of augend and addend. The parallel computer has speed advantages; the serial computer, slightly slower normally, effects savings in circuitry and can handle words of variable length. Both serial and parallel computers in the prior art have had adders, i.e., devices which accept two equal order digits and the carry from the previous order and produce a sum and carry. In serial binary machines the adder is quite simple, in parallel decimal machines the adder (or the arithmetic unit which comprises several adders and storage registers or accumulators) my be very complex.

Stored program computers generally act upon data words according to a program of machine instructions. A word is a basic group of data made up of characters (alphameric) or digits. The digit in turn is made up of several basic data units termed bits.

Computers operate on pure binary, binary-coded decimal, biquinary decimal, pure decimal and many other configurations of bits making up a digit. The binary-coded decimal (BCD) format includes four bits valued 1–2–4–8, each bit being either present (1) or absent (0). The 1–2 combination is the digit 3; 1–2–4 is the digit 7; and 1–8 is the digit 9. In addition to the 1–2–4–8 bits, a parity check bit which, when added to the other bits present, always results in an odd total number of bits, is often included. Other bits may be included in the digit format, such as zone bits for alphameric characters, or logical indicator bits (flags) which may be used for sign control, word-end marks, or for controlling other non-digital functions.

Division in prior art computers is generally performed by subtraction or other manipulation of the divisor with respect to the dividend, in the adder. The program unit controls a series of add (or subtract) operations which performs division. The extensive program unit, together with the adder, requires a large investment.

*Objects.*—The primary object of the invention is to divide electronically with minimum investment in the computer.

Another object of the invention is memory-centered division.

A further object of the invention is to divide electronically by repetitive memory references according to addresses stored in memory address register storage.

A still further object of the invention is to divide by memory references according to a table lookup system in a memory-centered dividing computer.

Another object of the invention is to divide by a memory-centered divider which operates in conjunction with a memory-centered multiplier and memory-centered adder in a computer by time-sharing of hardware.

*Summary of the invention.*—The invention is a memory-centered, low-investment dividing computer, in which operations are performed by multiple references to memory. The memory has stored in it an add table, each location being adapted to store a four-bit BCD digit and a flag denoting the sum and carry, respectively, of two decimal digits which make up the table address of the location. For example, units digits 7 and 6 of addend 37 and augend 46, when added together, equal 13. Memory address xxx76 contains a flagged 3 (3 and carry). The sum digit is available from the table by addressing the table according to the addend digit and augend digit as address digits, following table lookup add procedure. This table lookup add operation takes place during the divide operation as the successive subtractions (complement additions) of the divisor are made from the dividend. Full details of table lookup add appear in copending application, Serial Number 77,112 filed December 20, 1960, William H. Rhodes, James G. Brenza and Wayne D. Winger, entitled "Computer," which in copending with this application is a continuation-in-part of U.S. patent application, Serial Number 847,306 now abandoned of William H. Rhodes, James G. Brenza and Wayne D. Winger, filed October 19, 1959, entitled "Computer" and which is commonly assigned. The positioning of the sum of two digits at a table location addressed by the digits is basic to the development of the quotient as well as to the table lookup add operation.

The division operation is carried on over a multiplicity of memory reference cycles. These cycles fit into three basic groups, lineup, subtract and add back. Lineup aligns the high order of the dividend with the high order of the divisor. The proper order of the dividend and the low order of the divisor thus are set up for the first reduction cycle. During lineup, the signs are scanned to determine the sign of the quotient and the quotient sign is stored.

Subtract provides for subtractions of the entire divisor, digit by digit, from an equal number of positions of the dividend. The subtraction is a four step table lookup complement add operation, in which memory locations are referenced in the following sequence:

*Step 1*.—Read out divisor digit.

*Step 2*.—Read out dividend digit.

*Step 3*.—Read out difference digit from the add table in memory referenced by an address determined by the divisor digit and the dividend digit.

*Step 4*.—Store the difference digit.

A constant scan is maintained to recognize the high order digit of the divisor and the high order digit of the dividend upon which recognition an end divide or an end reduction cycle decision can be based.

Decision elements ascertain that the reduction cycle is complete when the remainder minus condition is detected. If the remainder is not minus, another subtract cycle is taken. When the remainder goes minus, the number of successful subtractions previously taken to make it go minus being stored in the form of an address in the add table (the quotient digit is developed from this address) and an add back cycle is taken or division is ended.

The quotient digit is developed as a table address. A quotient digit address register is initially set to address the add table zero. The content of the quotient digit address register is incremented after each subtraction until the remainder minus decision is made. The quotient digit is then obtained by table lookup and stored in a quotient accumulator area in memory.

Add back provides housekeeping to return the partial dividend to a positive value for the next reduction cycle. End add back decision logic determines that the add back operation is complete and activates high order zero logic; if the high order digit is a zero, the partial dividend (remainder) is shifted. Preparation is made to start another reduction cycle of the divisor from the new partial dividend.

The end divide decision is made during a subtract. No provision is made to make a final add back; the programmer can correct or manipulate the negative remainder if desired.

A feature of the invention is the use of a quotient digit address register to develop the quotient by table lookup. The quotient digit address register, which shares incrementing means with several other address registers, is altered after each subtraction to address the table location for the corresponding quotient digit.

The quotient digit address register can be used for any desired purpose during non-divide operations.

The foregoing and other objects, features and advantages of the invention will be apparent from the following more particular description of a preferred embodiment, as illustrated in the accompanying drawings.

SECTION B—DRAWINGS

In the drawings:

FIG. 1*a* is a functional block diagram illustrating a preferred embodiment of the computer.

FIG. 1*b* is a conversion diagram for relating FIG. 1*a* to FIGURE 11 and following in copending application, Serial No. 77,120, William H. Rhodes, James G. Brenza, Wayne D. Winger and Robert C. Jackson, entitled, "Computer," filed December 20, 1960 issued August 14, 1962 as Patent No. 3,049,295 and commonly assigned with this application.

FIG. 2 is a chart of the add table which is stored in memory.

FIG. 3 is a chart of the multiply table.

Figure 1A:
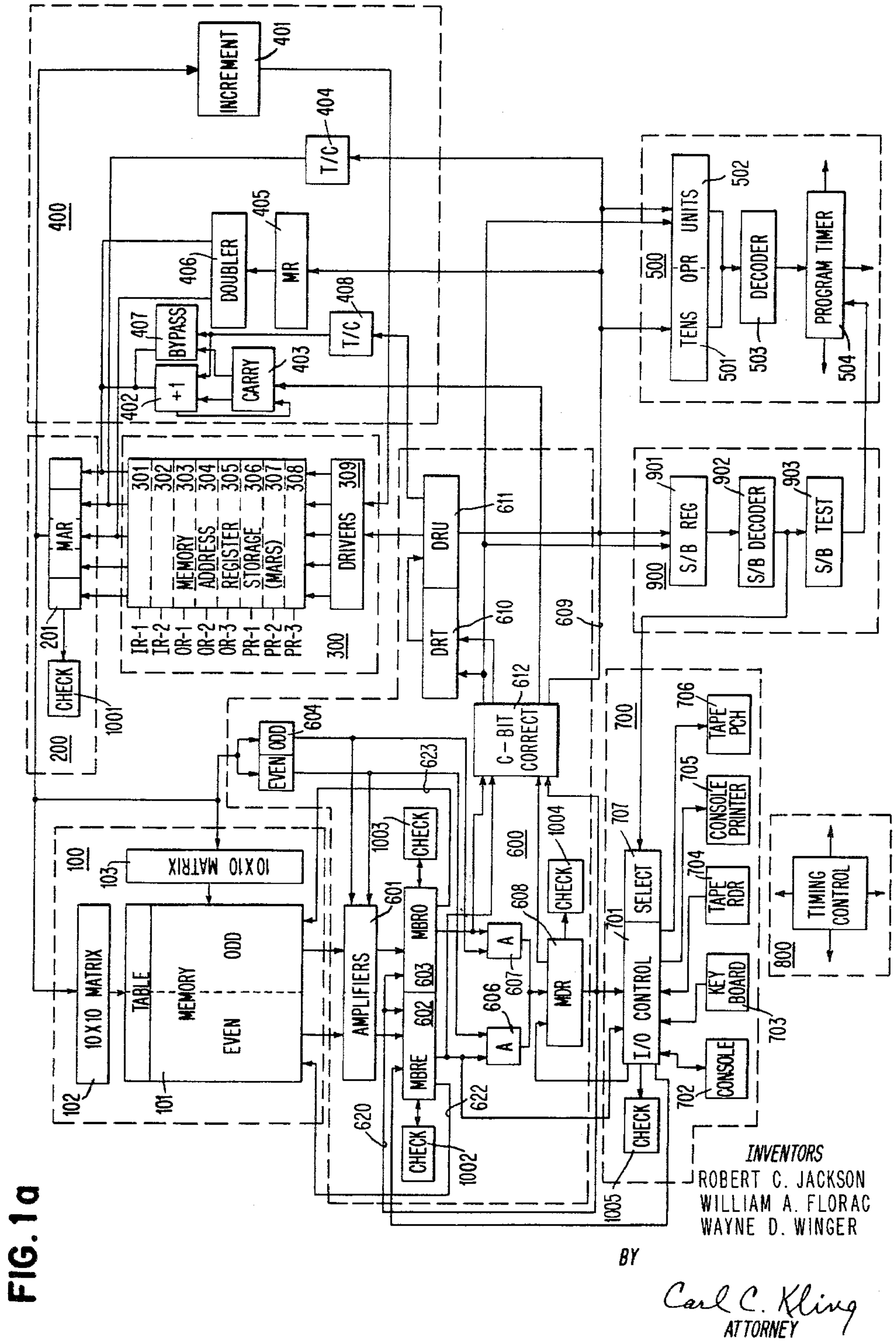

Logic flow in FIGS. 1*a*, 4, 6 and 9–14 is from left to right on each sheet of drawings except where otherwise indicated by arrowheads. Each input line is labeled with a description of the functional signal which causes the related logic block to accomplish its function as designated by a type designation such as A (AND). A more extensive discussion and explanation of the circuits making up the various blocks shown in FIG. 1*a* is available in copending patent application of William H. Rhodes, James G. Brenza, Wayne D. Winger and Robert C. Jackson, Serial No. 77,120, filed Dec. 20, 1960, issued August 14, 1962 as Patent No. 3,049,295.

SECTION C—INDEX

SPECIFICATION
SECTION A—INTRODUCTION
- Objects
- Summary of the Invention

Figure 1B:
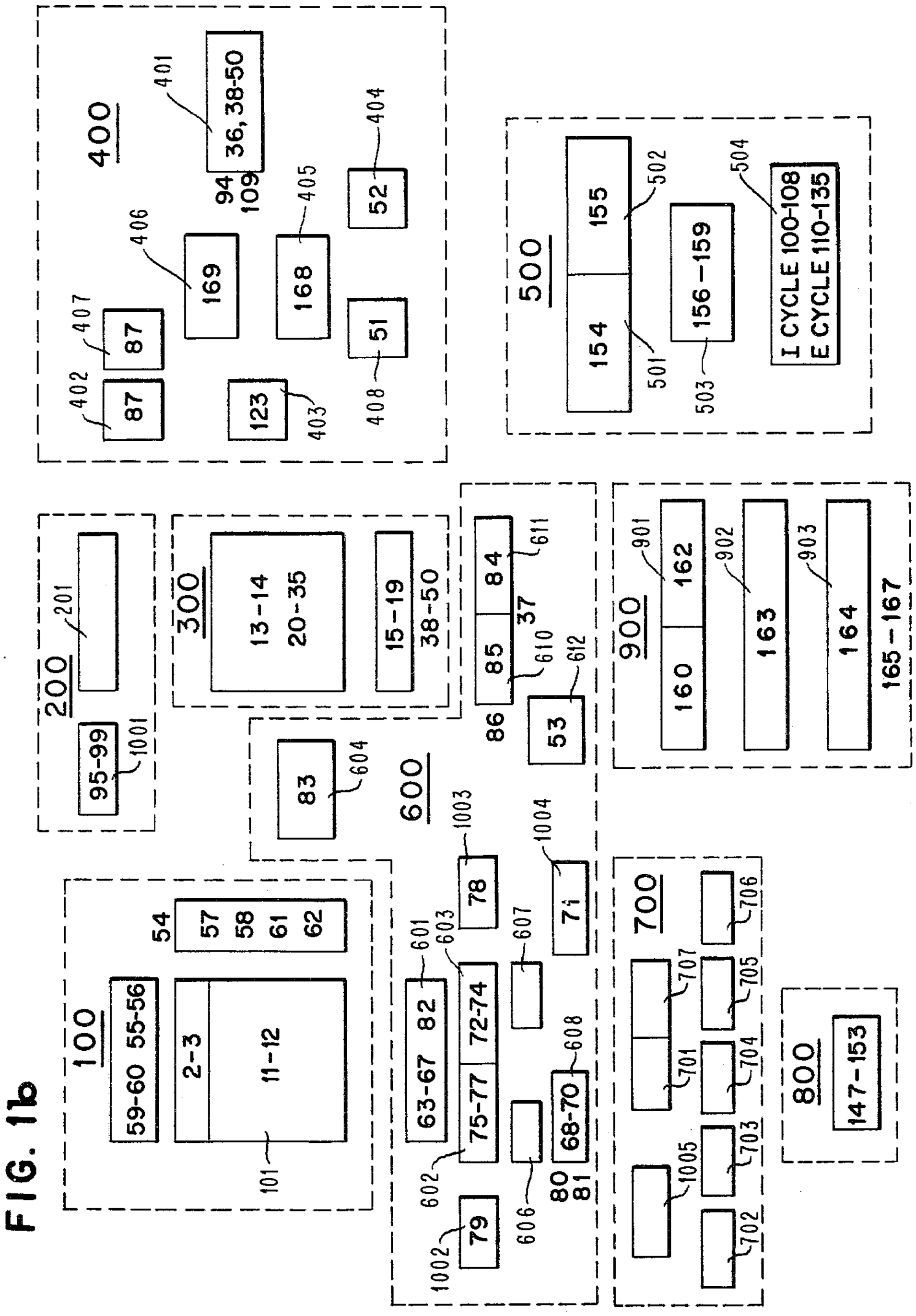
Figure 4:
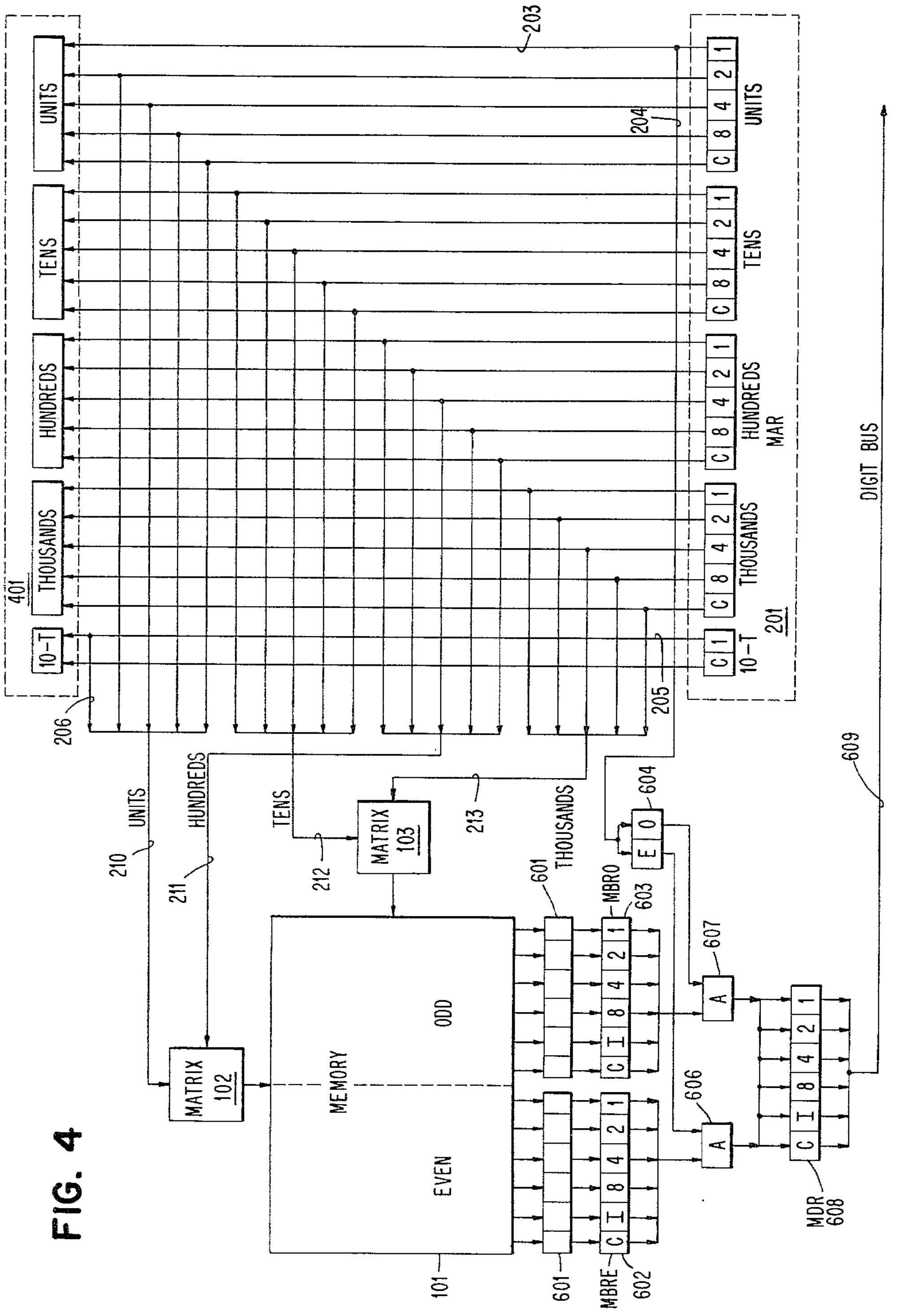
FIG. 4 is a more detailed functional block diagram of memory addressing area 200 and memory read out area 600 of FIGURE 1*a*.
Figure 5:
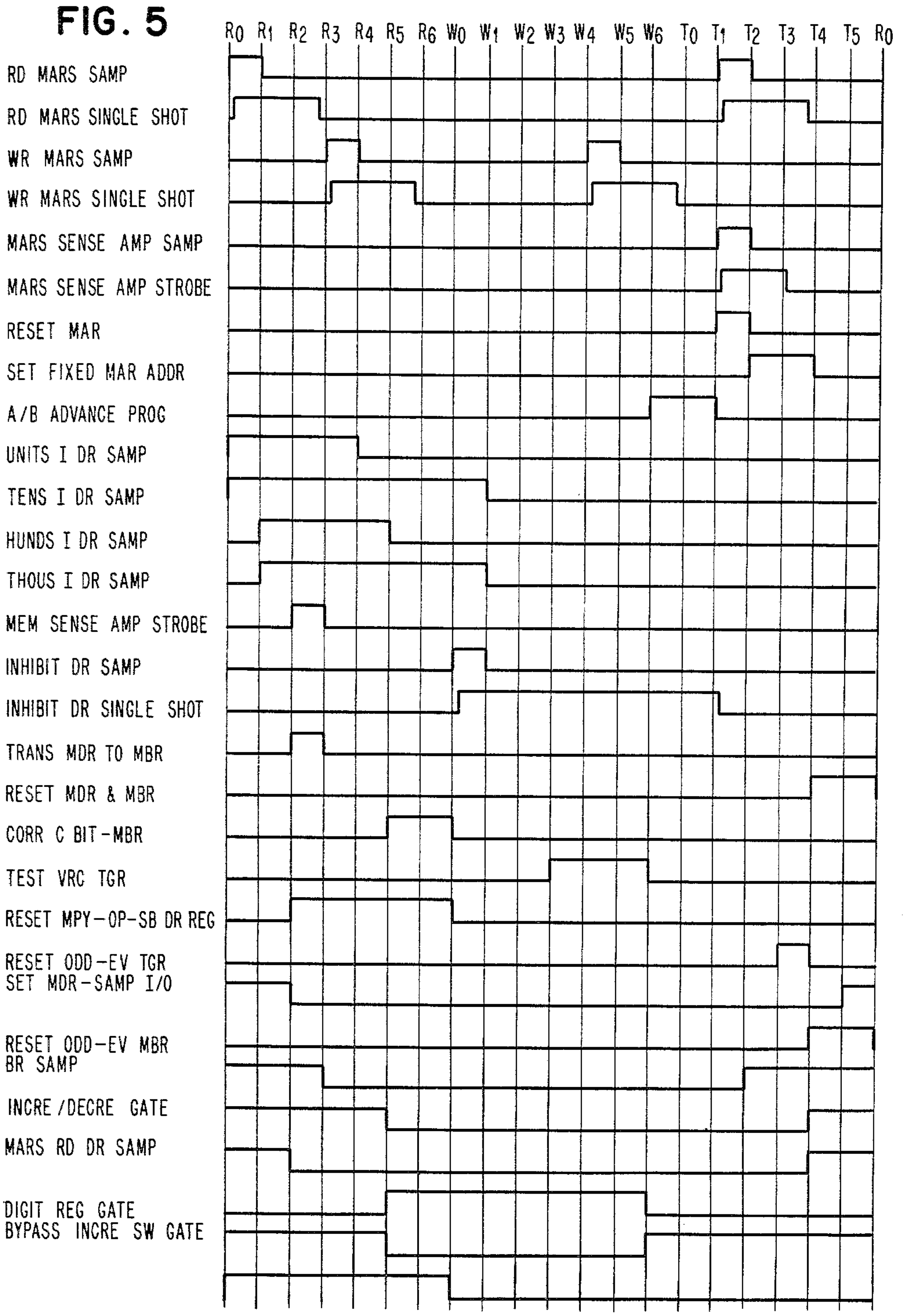
FIG. 5 is a timing chart.
Figure 6:
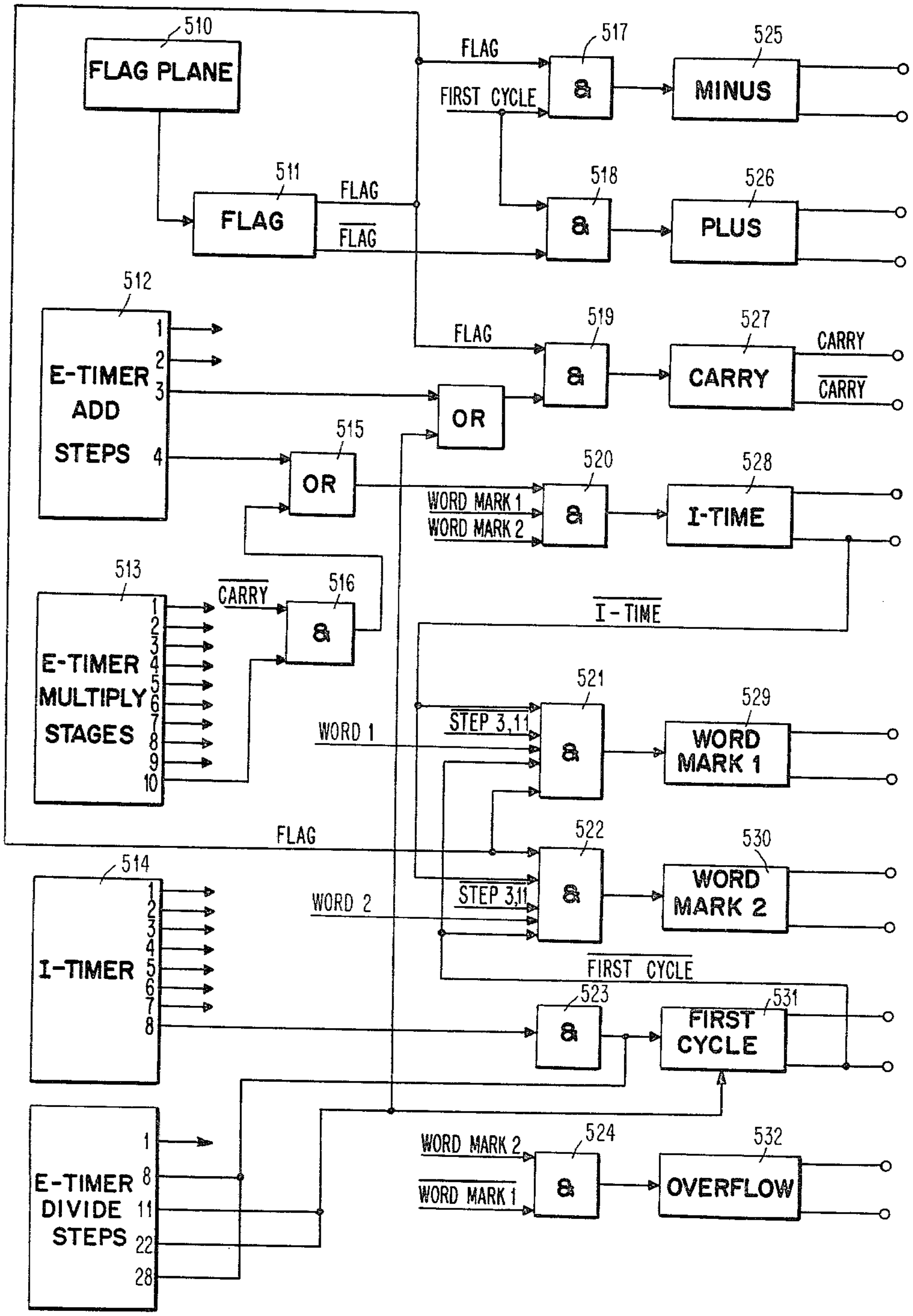
FIG. 6 is a block diagram illustrating flag decoding.
Figure 7:
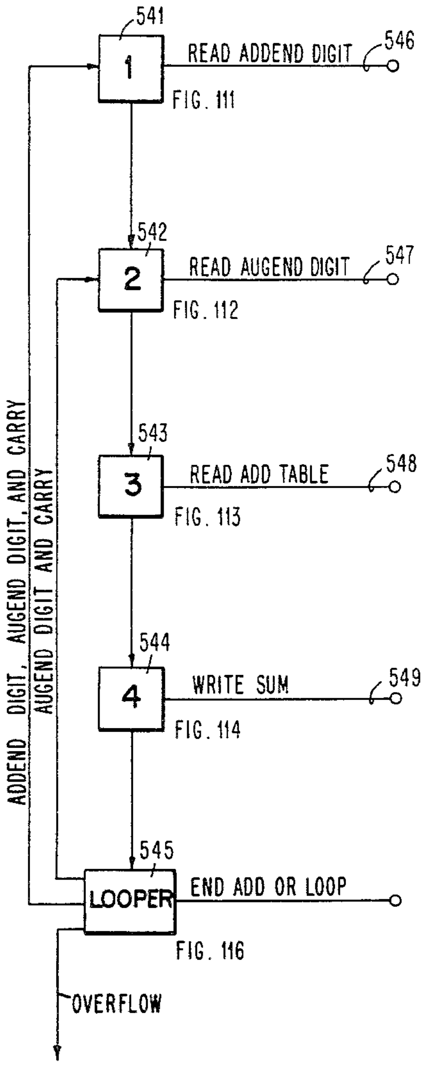
FIG. 7 is a chart illustrating the four steps and two loops involved in the add operation.
Figure 8:
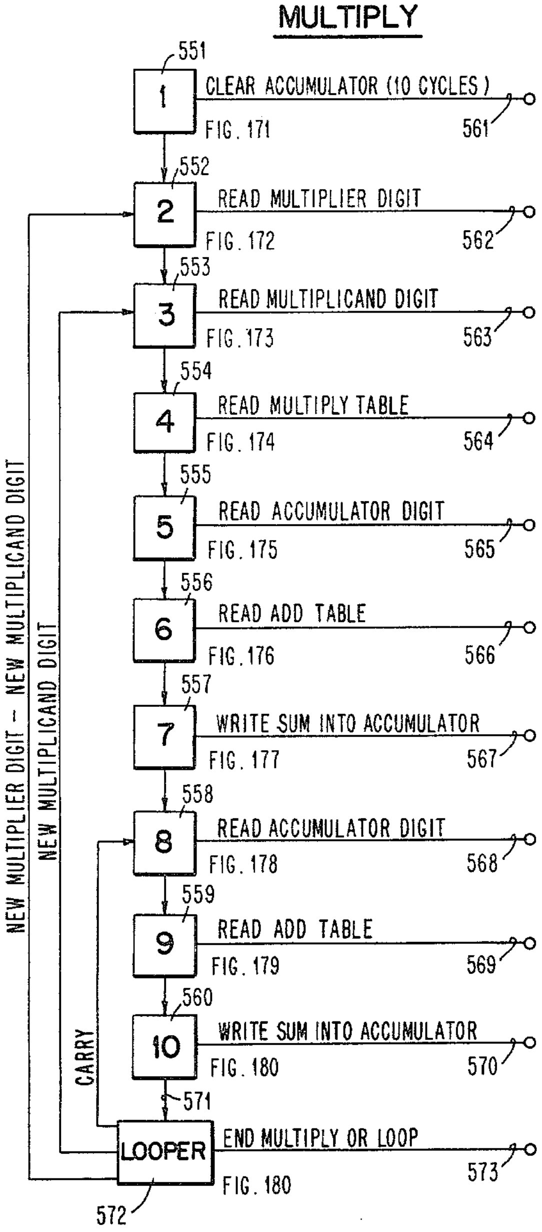
FIG. 8 is a chart illustrating the 10 stages and three loops involved in multiplication.
Figure 9:
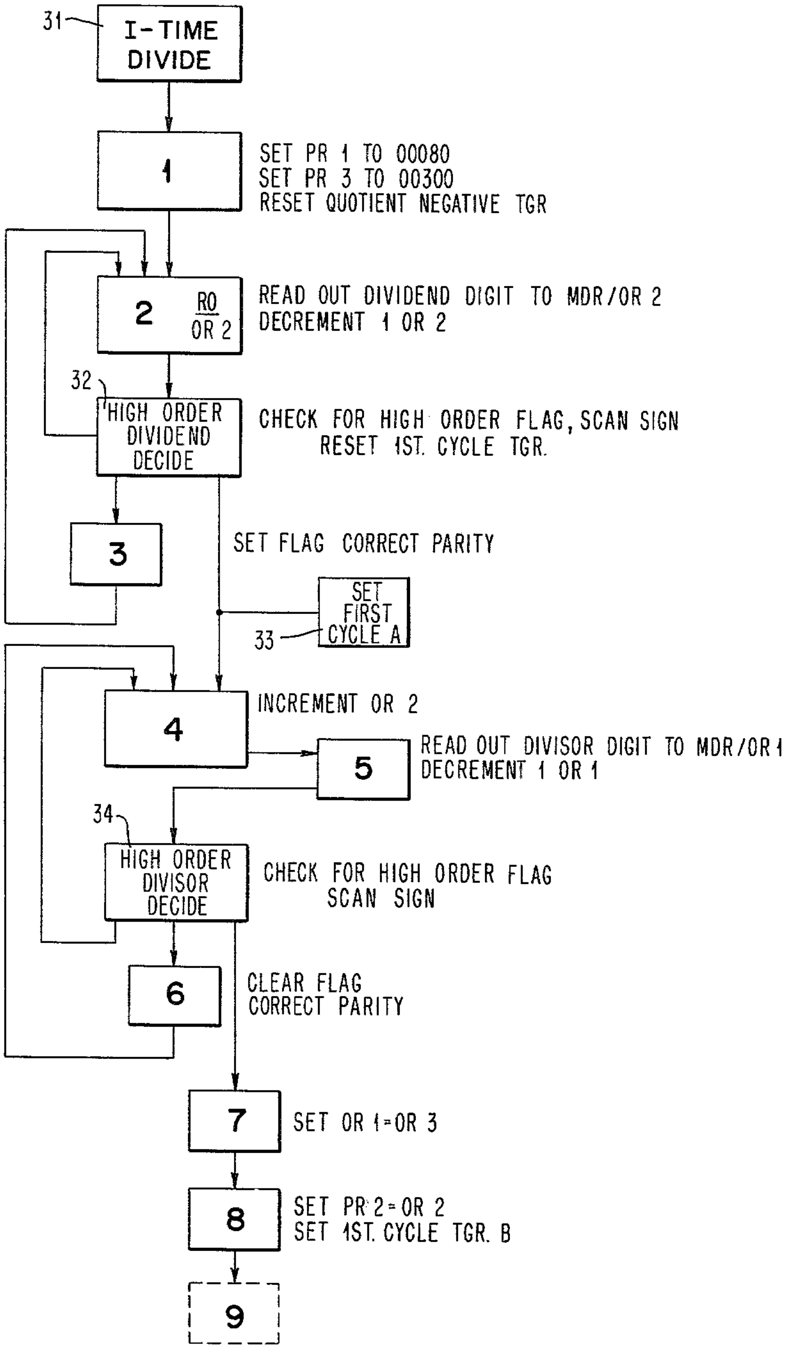
FIG. 9 is a chart illustrating the 8 steps of the lineup group of the divide program.
Figure 10:
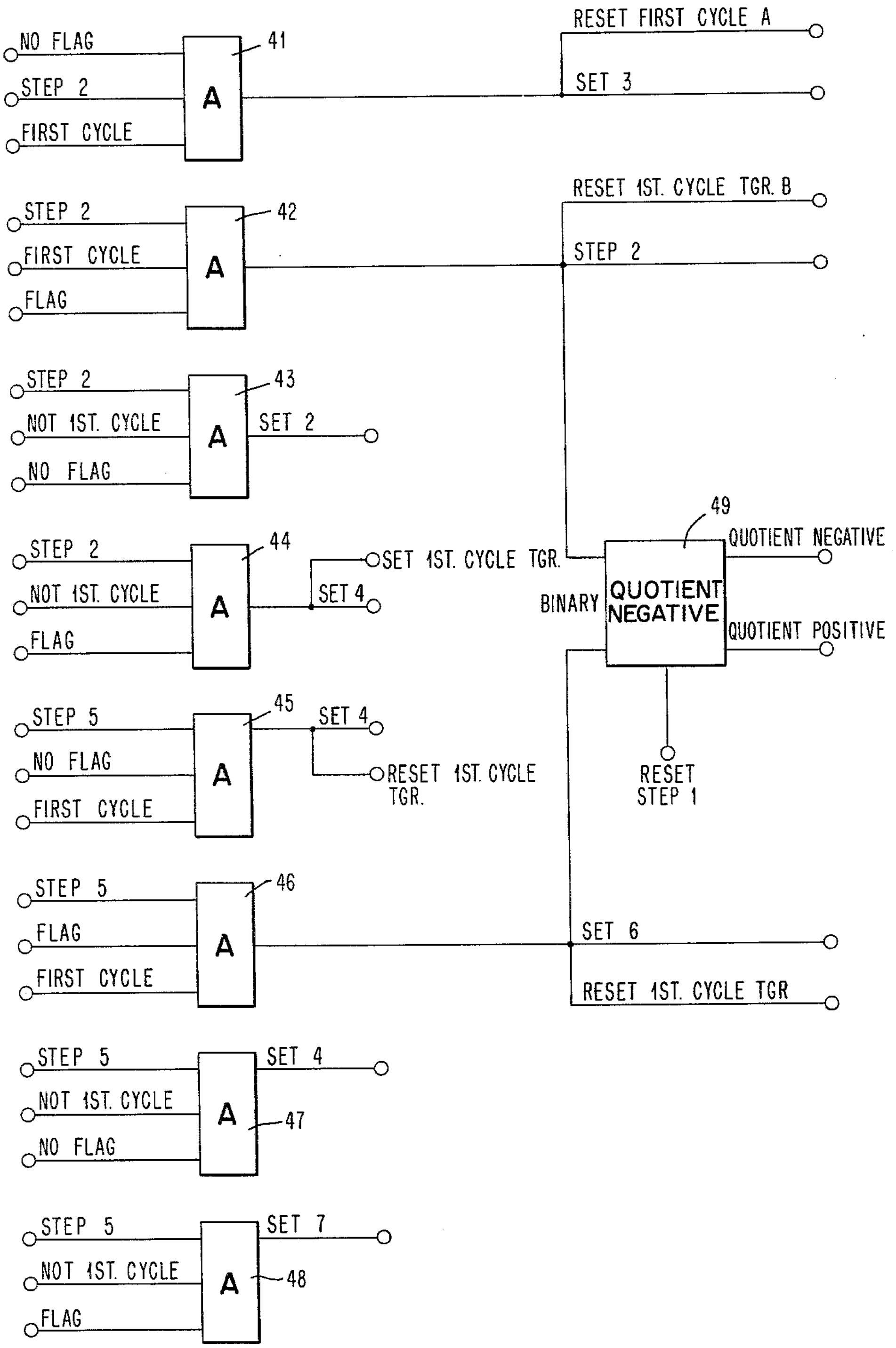
FIG. 10 is a block diagram of decision circuits of the lineup group of FIG. 9.
Figure 11:
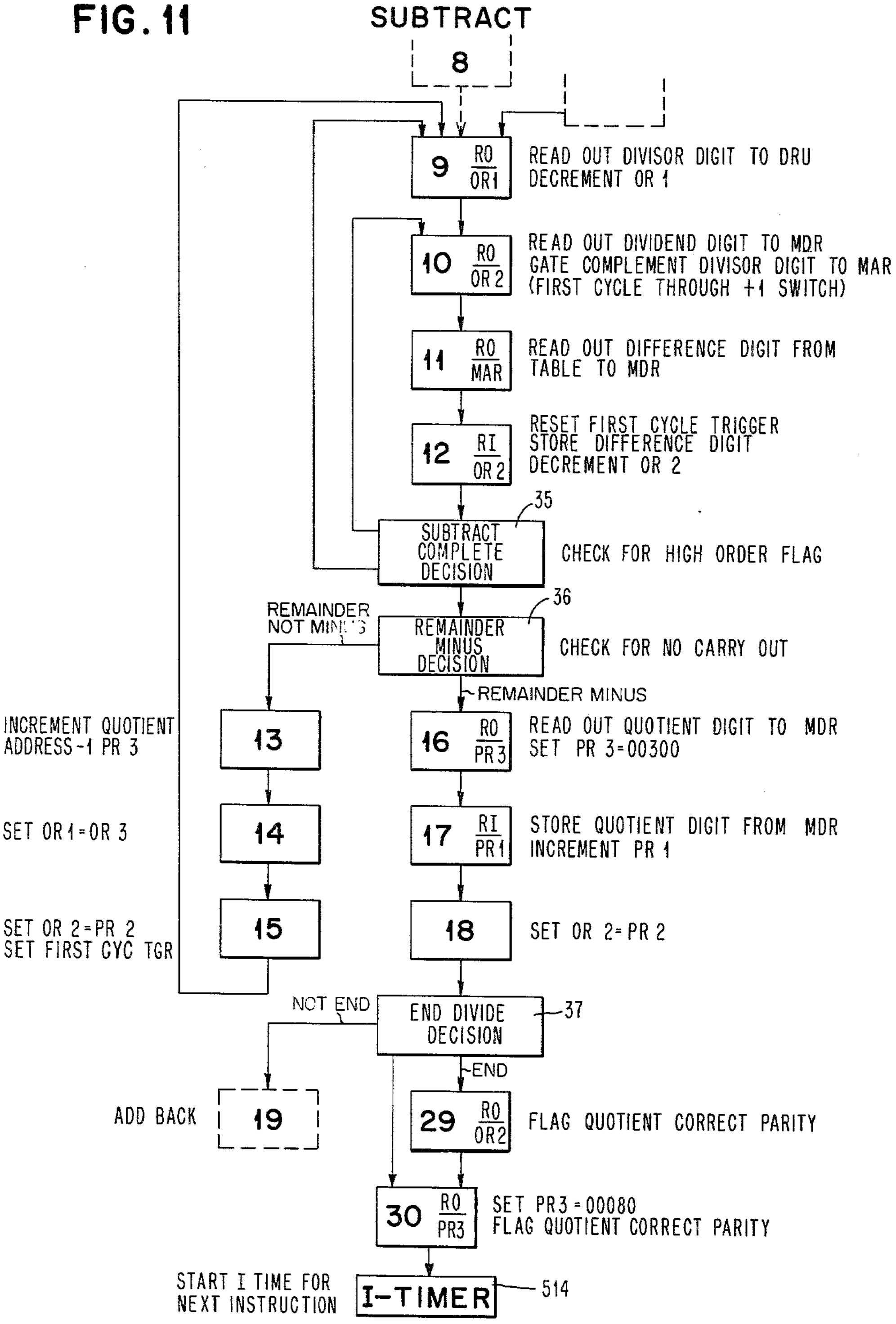
FIG. 11 is a chart of subtract steps 9–18 and end divide steps 29–30 of the subtract group of the divide program.
Figure 12:
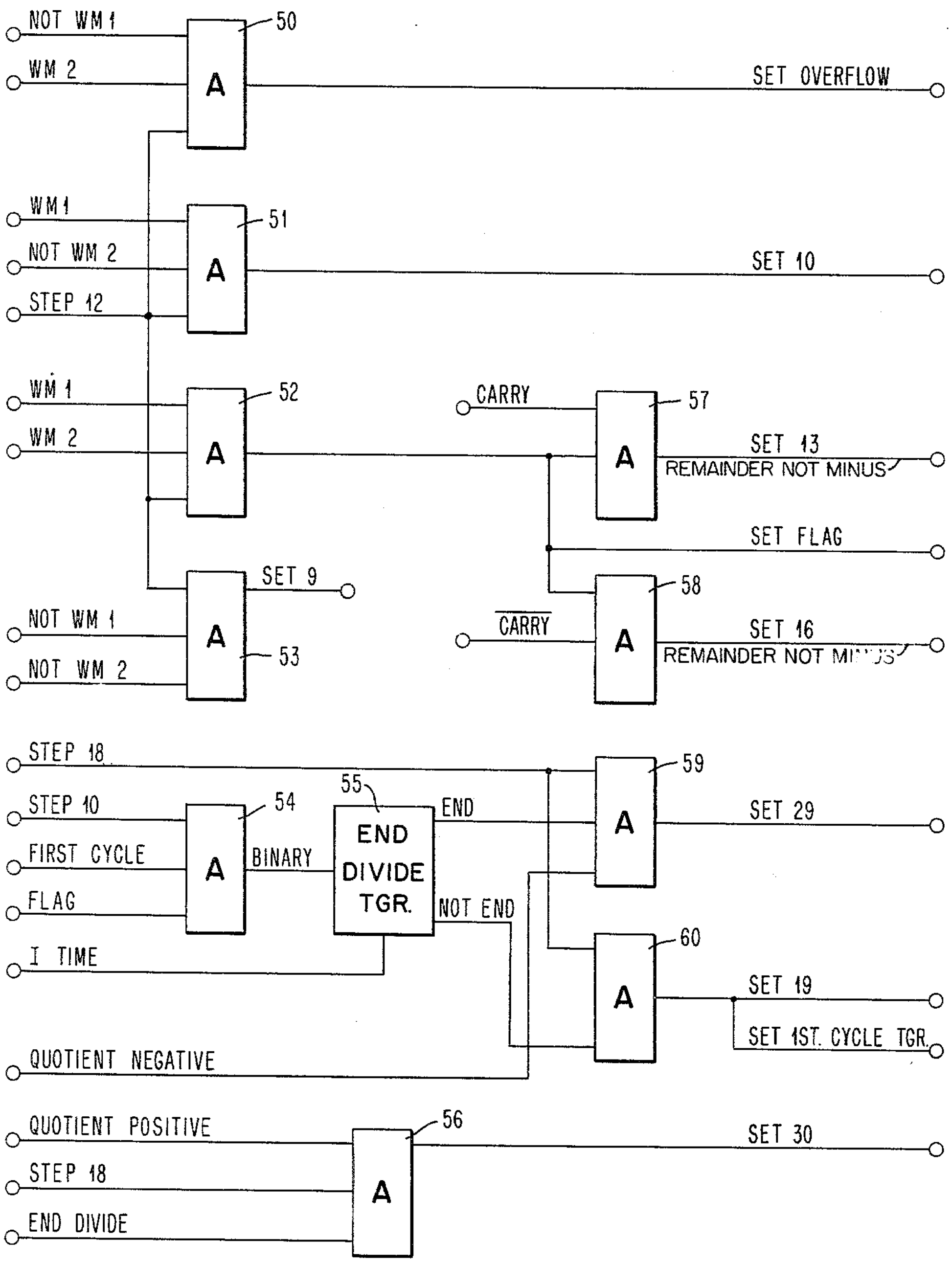
FIG. 12 is a block diagram of decision circuits of the subtract group of FIG. 11.
Figure 13:
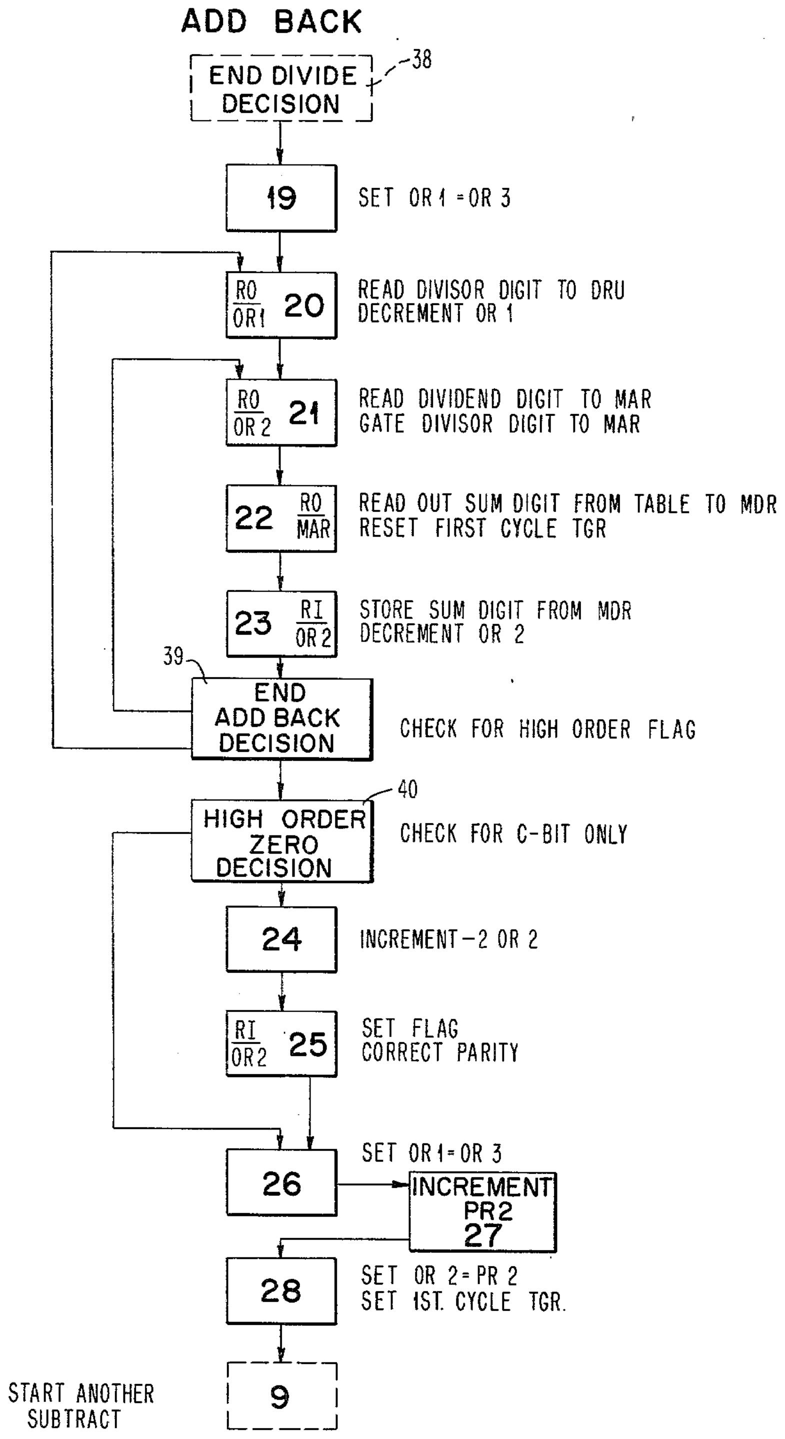
FIG. 13 is a chart of the add back group of divide steps 19–23.
Figure 14:
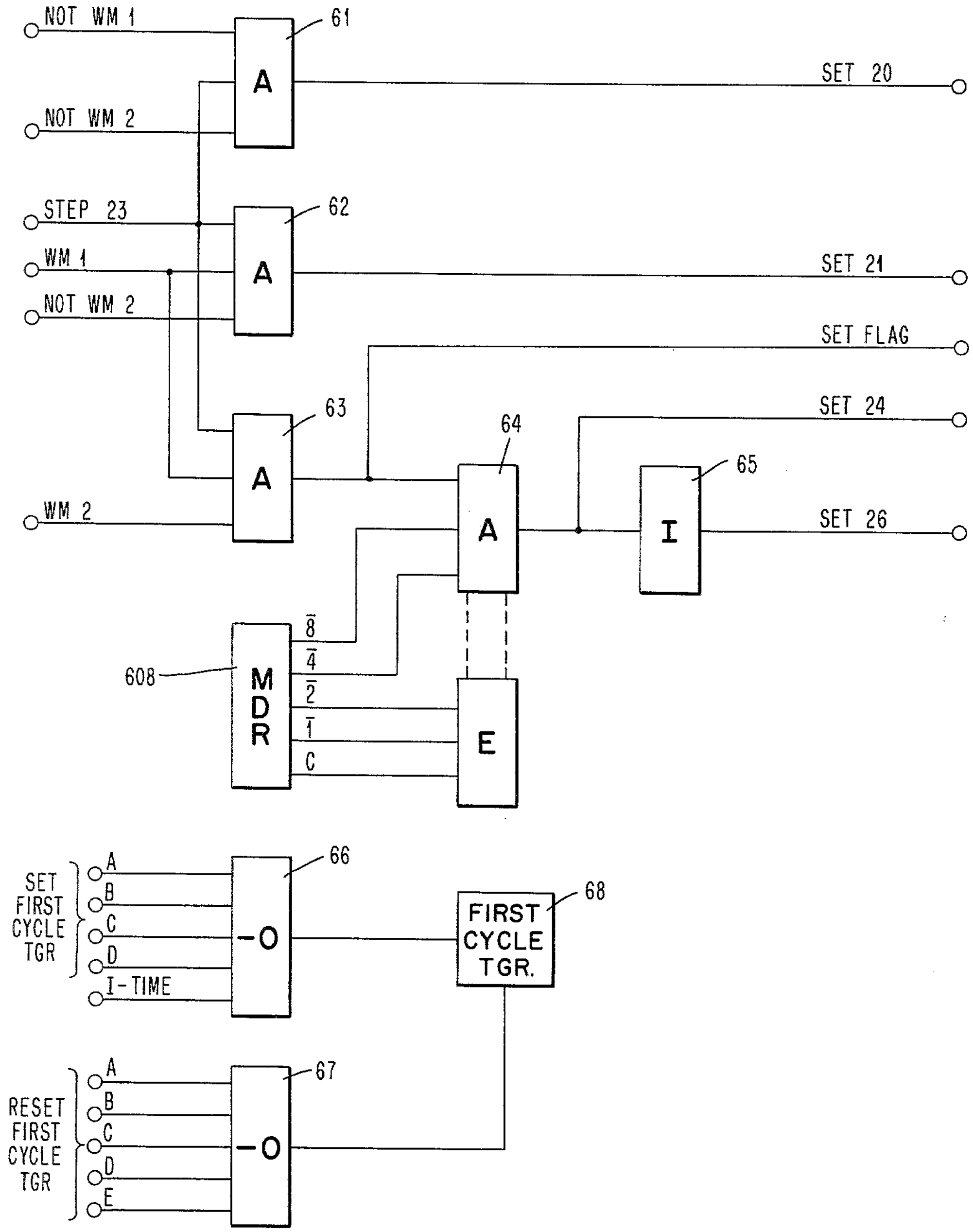
FIG. 14 is a block diagram of decision circuits of the add back group of FIG. 15.

SECTION B—DRAWINGS
SECTION C—INDEX
SECTION D—ARITHMETIC OPERATIONS
SECTION E—DIVIDE
- Rules for Division
- Programming
- Internal Operation
- FIG. 9—Lineup
- FIG. 10—Lineup Decisions
- FIG. 11—Subtract
- FIG. 12—Subtract Decisions
- FIG. 13—Add Back
- FIG. 14—Add Back Decisions CLAIMS SECTION—CLAIMS
DRAWINGS
- FIG. 1*a*—Overall Block Diagram
- FIG. 1*b*—Conversion Table
- FIG. 2—Add Table
- FIG. 3—Multiply Table
- FIG. 4—Memory Addressing and Readout
- FIG. 5—Timing Chart
- FIG. 6—Flag Decoding
- FIG. 7—Add Sequence
- FIG. 8—Multiply Sequence
- FIG. 9—Lineup
- FIG. 10—Lineup Decisions
- FIG. 11—Subtract
- FIG. 12—Subtract Decisions
- FIG. 13—Add Back
- FIG. 14—Add Back Decisions

SECTION D—ARITHMETIC OPERATION

The computer operates on a stored program of an indeterminate number of twelve-digit two-address instructions. The first two digits form the operation code (op code); the next five digits are a P address; the final five digits are a Q address; as follows:

| $O_2O_1$ | $P_5P_4P_3P_2P_1$ | $Q_5Q_4Q_3Q_2Q_1$ |
|---|---|---|
| Op Code | P—Number | Q—Number |

The op code, in machine language, comprises two decimal digits. For convenience in understanding programming, mnemonic representations of the operations, as normally used by the programmer, are used herein wherever appropriate.

The 5-digit P-number is for most instructions the address of the location in memory at which a digit is stored. The P-addressed digit is for many instructions the units order of the P-field, which includes locations P and lower-addressed adjacent locations extending to that location at which the flagged high order digit of the P field is located. The P-addressed digit is for certain other instructions the beginning of record. The record includes the P-addressed digit and adjacent higher-addressed memory locations extending to and including the location at which the record end mark is stored. In certain other instructions the P-number is treated as a number, i.e., as digital data.

The 5-digit Q-number may similarly be treated as an address or as data. The op code determines the treatment of the P-number and Q-number during the instruction. Either the P-number and Q-number, or both, may be modified during the execution of the instruction.

In machine language, mnemonic, text, and explanatory text, instructions include the following:

| | | |
|---|---|---|
| 21 | A ADD | Add Q-field to P-field. |
| 11 | AM ADD (IMMEDIATE) | Add Q-number to P-field. |
| 22 | S Subtract | Subtract Q-field from P-field. |
| 12 | SM Subtract Immediate | Subtract Q-number from P-field. |
| 23 | M Multiply | Multiply Q-field by P-field. |
| 13 | MM Multiply Immediate | Multiply Q-number by P-field. |
| 28 | D Divide | Divide Q-field by P-field. |
| 25 | TD Transmit Digit | Transmit digit from Q to P. |
| 15 | TDM Transmit Digit Immediate | Transmit $Q_1$ to P-location. |
| 26 | TF Transmit Field | Transmit Q-field to P-field. |
| 16 | TFM Transmit Field Immediate | Transmit Q-number to P-field. |
| 31 | TR Transmit Record | Transmit Record at Q to P-field. |
| 36 | RN Read Numerically | Read from Q-device to P-record. |
| 32 | SF Set Flag | Set flag bit into P-location. |
| 33 | CF Clear Flag | Reset flag bit in P-location to zero. |
| 24 | C Compare | Compare Q-field with P-field and determine if P-field is high or equal. |
| 14 | CM Compare Immediate | Compare Q-number with P-field and determine if P-field is high or equal. |
| 34 | K Control | Execute the control function specified by $Q_4$–$Q_3$ on the input/output device specified by $Q_2$. |
| 35 | DN Dump Numerically | Transmit P-address through location 19998 to output device specified by Q-address. |
| 36 | RN Read Numerically | Transmit numeric data from Q-number specified input device to P-location and upward. |
| 37 | RA Read Alphanumerically | Transmit alphanumeric data from Q-number specified input device to P-location and upward. |
| 38 | WN Write Numerically | Transmit numeric data from P-location upward to the Q-number specified output device. |
| 39 | WA Write Alphanumerically | Transmit alphanumeric data from P-location upward to Q-number specified output device. |
| 27 | BT Branch and Transmit | Branch unconditionally to the P-addressed instruction; transmit Q-field to (P–1) field. Save address of next instruction. |
| 17 | BTM Branch and Transmit Immediate | Branch unconditionally to the P-addressed instruction. Transmit Q-number to (P-1) field. Save address of next instruction. |
| 42 | BB Branch Back | Branch unconditionally to the instruction at a previously-stored address. |
| 43 | BD Branch on Digit | Test Q-addressed digit and branch to P-addressed instruction on non-zero. |
| 44 | BNF Branch No Flag | Test Q-addressed digit and branch to P-addressed instruction if no flag. |
| 45 | BNR Branch No Record Mark | Test the digit in the location specified by a previously-stored address and branch to P-addressed instruction if digit is not a record mark. |
| 46 | BI Branch Indicator | If Indicator specified by Q-number is on, branch to P-addressed instruction. |
| 47 | BNI Branch No Indicator | If Indicator specified by Q-number is off, branch to P-addressed instruction. |
| 48 | H Halt | Stop automatic operation. |
| 49 | B Branch | Branch unconditionally to the P-addressed instruction. |
| 50–99 | NOP No Operation | Proceed, ignoring instruction. |

Most instructions require an instruction period (I-cycle) and an execution period (E-cycle). The I-cycle, for most instructions, comprises a fixed 7 memory references and a dummy cycle, which results in setup of the computer to execute the op code instruction upon the contents of the P and Q addresses. The E-cycle varies with the operation, and may be zero, one, several or many memory references according to the complexity of the operation.

The digit format is binary-coded decimal (BCD)—four bits; check bit; and flag bit. Data words are variable length. Beginning of word (Word Mark) of data words is signalled by a flag in the high order position; a flag in the low order position indicates a negative number. The flag has various meanings depending on its location in the word and upon the particular operation and step of the operation being performed.

*Data flow—FIG. 1*

The computer comprises ten major functional areas numbered 100–2000, etc., blocks within major functional areas being numbered 101–102, etc.

The major functional areas are as follows:

100 Memory Area
200 Memory Addressing Area
300 Memory Address Register Storage Area
400 Memory Address Modification Area
500 Operation Control Area
600 Memory Read-out Area
700 Input-Output Area
800 Timing Control Area
900 Sense-Branch Area
1000–2000 Check and Miscellaneous Area

*Memory area 100* comprises a 120,000 magnetic core memory of 20,000 six-bit digit locations, each location having a unique address 00000–19,999. The memory is divided into an odd section and an even section; since a row of cores in memory contains 12 cores, the contents of a pair of locations (12 cores or 2 digits) are read out simultaneously, the pair always including an even addressed location and the higher adjacent odd addressed location. A pair of digits is normally read out and regenerated during a memory reference cycle. The memory is subject to vertical half-selection by a 10 x 10 matrix switch 102 and horizontal half-selection by a similar 10 x 10 matrix switch 103. These two addressing matrices control 10,000 combinations, i.e., the 10,000 even addressed locations and their odd pairs.

*Memory addressing area 200* controls the memory location involved in any memory reference. Memory address register 201 (MAR) connects to matrices 102 and 103 to select the address in memory according to the content of MAR.

*Memory address register storage area 300* (MARS) is an array of eight 5-digit magnetic core registers 301–308, denominated instruction registers (IR1 and IR2), operand registers (OR1, OR2 and OR3) and product registers (PR1, PR2 and PR3). These registers serve to store the addresses in memory at which instructions, operands and products are to be found; the particular MARS register or registers involved in any memory reference cycle is chosen by the program timer 503. A set of drivers 309 provides power to set the register cores.

*Memory address modification area 400* is instrumental in controlling the flow of each addition problem and of many other instructions through the sequence of operations. It also controls the flow of the stored program. Increment switch 401 is operable, under control of means within the operation control area, to increment by 1, increment by 2, decrement by 1, or transmit unaltered (bypass) a memory address as it is transmitted from MAR 200, and regenerate the modified address back in the proper register in MARS. The increment-2 function is useful in instruction cycles for readout of instruction control words which are set in MARS two digits at a time; decrement-1 is useful in stepping, low order to high order, through all the digits of a multi-order numeric word; increment-1 is useful in the transmission of records.

Plus-1 switch 402, bypass switch 407, carry switch 403, and true-complement switch 408 are part of the addend digit path to MAR during setup for addressing the add table in memory. Plus-1 switch 402 inserts the carry from the addition of the previous order, when carry trigger 403 is set; bypass 407 passes the addend digit when the carry switch is unset. True-complement switch 404 is part of the augend digit path to MAR during setup.

Multiplier register 405 and doubler 406 are used in the multiply operation only. To generate a three-digit number to address the multiply table in memory, the multiplicand digit is used for the tens digit of the address, and the multiplier digit is doubled to form a units position digit with an even number, and as a hundreds position digit either a 2 or a 1 depending on whether or not the doubling produced a carry.

*Operation control area 500* includes two single-digit operation registers OPR tens 501 and OPR units 502, decoder 503 and program timer 504. The program timer controls other sections of the computer in sequence according to the op code as decoded by decoder 502.

*Memory readout area 600* includes sense amplifiers 601, which under control of small signals from memory cores produce pulses of sufficient power to operate memory buffer register even (MBRE) 602 and memory buffer register odd (MBRO) 603.

Memory readout places the content of an even-addressed digit location of MBRE and of the next higher odd-addressed location in MBRO, regardless of which of the two was addressed. During each normal memory reference operation, MBRE and MBRO regenerate the data they receive back into the referenced location in memory. Upon certain operations the read-in from memory to MBRE, or to MBRO, may be inhibited, during which memory reference MBRE or MBRO may be set from another source, such as MDR, via channel 620. In any case, on any memory reference, the referenced pair (even and next higher odd memory locations) may be regenerated via path 622 or 623 with the data from MBRE and MBRO, respectively. Even-odd switch (E/O) 604, however, is subject to the 1-bit position of the units order of the address, and therefore is even when the 1-bit is 0, and odd when the 1-bit is 1. The E/O controls AND circuits 606 and 607 so that only the memory location addressed feeds its content to the memory data register (MDR) 608. MBRO connects directly to digit register tens (DRT) 610; MBRE connects via AND circuit 606, MDR 608 and bus 609 to digit register units (DRU) 611. This connection makes necessary the transposition of digits of multiply products in memory; the even-addressed location digit goes to DRU; the tens digit from the next higher odd-addressed location goes to DRT. The flag is not always carried along; C-bit correct circuit 612 retains odd parity in the resulting 5-bit digits despite flag changes.

*Input-output area 700* includes input-output control 701, console 702, keyboard 703, paper tape reader 704, console printer 705, paper tape punch 706, and select means 707.

*Timing control area 800* includes means to generate the various timing pulses for controlling other areas of the computer.

*Sense-branch area 900* includes sense-branch register (SBR) 901, sense-branch decoder (SBD) 902, and sense-branch test (SBT) 903.

*Checking and miscellaneous area 1000* includes check blocks 1001, associated with MAR 201; 1002, associated with MBRE 602; 1003, associated with MBRO 603; 1004, associated with MDR 608; and 1005, associated with I/O control 701.

*Glossary*

Functional units are referred to by name, as shown in the following glossary.

| Name | Descriptive Name | Number |
|---|---|---|
| Memory | Memory | 101 |
| MBRE | Memory Buffer Register-Even | 602 |
| MBRO | Memory Buffer Register-Odd | 603 |
| MAR | Memory Address Register | 201 |
| Plus-1 | Plus-one Switch | 403 |
| Doubler | Doubler | 404 |
| MR | Multiplier Register | 405 |
| Incrementer | Increment Switch | 401 |
| OPR | Operation Register | 501 |
| Decoder | Decoder | 502 |
| Program Timer | Program Timer | 503 |
| E/O | Even/Odd Switch | 604 |
| T/C | True/Complement Switch | 408, 404 |

*Definitions*

(1) Cycle—a unitary time in which a memory reference may be taken. This is the standard unit of operation, which in the preferred embodiment is twenty microseconds.

(2) E-time—execution time, which may include several cycles.

(3) Flag—a bit in each digit, which is used, depending upon location relative to the word, to indicate the beginning of word, negative word, or some other specified meaning.

(4) I-time—Instruction time, a period of time, including 8 cycles, during which the operation code and the various memory addresses to be involved in a particular instruction are set up preparatory to execution of the instruction during the following E-time.

(5) Location—A group of 6 cores in memory having a unique address, and capable of storing a digit made up of 1–2–4–8 bits, a check bit and a flag.

(6) Location Pair—An even-addressed location and the next higher odd-addressed location; or an odd-addressed location and the next lower even-addressed location.

(7) Read—Drive the magnetic cores of a location to 0; those cores which store 1's emit signals as they change state. Also—Make available through gating the bit content of a register.

(8) Write—Drive selected magnetic cores of a location to 1 according to 1's in data to be written. Also—Gate data to a register.

(9) Address—A number by which a memory location is identified.

(10) Regenerate—After having read the content of a memory location out to a register, write back into the same location the content of the register, both location and register retaining the data thereafter.

(11) Record Mark—A character, normally 8–2, which is defined and interpreted as the end of record in paper tape, typewriter input, and in memory.

*Program*

Operation of the computer is explained in the context of the following sample program:

| Instruction No. | Memory Location | Instruction | Function of Instruction |
|---|---|---|---|
| 1 | 00000–00011 | RN–01076–00300 | Read paper tape into 01076. |
| 2 | 00012–00023 | B–01076–00000 | Branch to 01076. |
| 3 | 01076–01087 | TRP–01184–01284 | Transmit contents of 01184 to 01284. |
| 4 | 01088–01099 | N–00300–00300 | Read Add Table from Paper Tape. |
| 5 | 01100–01111 | A–01297–01300 | Add Q-field to P-field. |
| 6 | 01112–01123 | S–01302–01304 | Subtract Q from P. |
| 7 | 01124–01135 | BNF–01112–01302 | Branch No Flag. |
| 8 | 01136–01147 | RN–00100–00300 | Read Multiply Table from Paper Tape. |
| 9 | 01148–01159 | M–01202–01204 | Multiply. |
| 10 | 01160–01171 | WN–00080–00099 | Write Numerically (Printer). |
| 11 | 01172–01183 | H–00000–00000 | Halt. |

*Data*

| Data | Locations Original | Involved Transferred to— | Content |
|---|---|---|---|
| —123456 | 01184–01189 | 01284–01289 | (1!23456!) |
| 7890123 | 01190–01197 | 01290–01297 | (7!890123) |
| 247 | 01198–01200 | 01298–01300 | (2!47) |
| 03 | 01201–01202 | 01301–01302 | (0!3) |
| 02 | 01203–01204 | 01303–01304 | (0!2) |
| Record Mark | 01205 | 01305 | (‡) |

Although the computer can treat instructions as data and proceed by accomplishing arithmetic functions thereon, the distinction between instructions and data is generally retained. A group of digits which is always treated as data is herein set off by enclosing parentheses. Since the data digits are effective in addressing memory during addition, particular care should be taken to avoid confusing an address with its data content.

When the machine is first turned on, triggers assume random states, and the various registers, switches and memory locations contain random values. The operator initiates a manual reset, in which all registers are reset to an initial condition, generally a no-information condition in which all bits, including the check bits are missing. A halt status is entered. Manual reset conditions the console for a start sequence. He may push an "insert" button on the console to select typewriter input and set MAR and MARS to the decimal zero (check bit only); the first typed instruction reads into location 0 0 0 0 0. Instruction address register IR1 contains 0 0 0 0 0—after the start button is pushed, the computer commences operation with instruction 0 0 0 0 0.

The first instruction typed into instruction address location 0 0 0 0 0 is a "read paper tape" instruction, RN–01076–00300, which enables the computer to read the record on paper tape into locations addressed 01076 upward when manually started. This is the means for storing the program in memory.

The second instruction is a branch instruction, B–01076–00000, which causes the computer to take further instructions from locations addressed 01076, upward. The branch instruction results in IR1 and MAR being set to 01076.

With instructions 1 and 2 in memory locations 00000–00011 and 00012–00023, respectively, the computer is switched from manual operation to fully automatic by a single depression of a Start Key on the console.

Instruction 1, stored in location 00000, is read out, setting up operation control area for paper tape reading. After the paper tape record is completely stored in memory locations 01076 upward, instruction 2 is set up and executed.

*I-time and E-time*

Most instructions involve a setup time (I-time) and an execution time (E-time). Certain branching and no-op instructions eliminate E-time entirely. The program timer produces eight discrete steps during I-time, all but the last of which are memory references. It then produces a variable number of steps defining E-time.

*Programmed operation*

Initially, MAR contains 00000, the address in memory of instruction 1, which instruction, being the standard 12-digit instruction word, extends to and includes location 00011. This instruction, in the illustrative program, is to Read Numerically (RN) into memory locations addressed by the P-number (01076) and upward, a record from paper tape as derived by paper tape reader (QQ3QQ). Successive digits from paper tape are stored in successive memory locations until the record mark is recognized. The record mark is stored in memory, tape reading stops, the computer recognizes the completion of execution of the instruction, and the computer calls for set-up of instruction 2 by initiating another I-time.

Instruction 2, B–01076–0000 (Branch to the instruction at location 01076) is taken from memory during its I-time. The execution of this branch instruction results in setup of IR1 and MAR with the address of instruction 3, which is the first of the instructions from paper tape. This address is 01076.

The performance of instruction 3 of the sample program, in complete detail, is as follows:

MAR contains 01076 at the end of the branch.

*I-time steps*

*Step 1* of I-time of the first stored program instruction, transmit, includes the following functions:

The number in MAR causes read-out of the similarly addressed memory location and its pair; since the number is even, the next higher memory location is read concurrently. The digits 4 and 9 go into MBRE and MBRO, respectively. The digit 4 read into MBRE passes to MDR and thence to the tens digit position of the OPR; the 9 from MBRO passes directly to the units digit position of OPR, which then holds 49. As normally occurs, the instruction digits 4 and 9 are also regenerated in the memory position from which they came. Step 1 signals from the program timer condition the incrementer to increment 2, modifying the content of IR1 to read 01078. MARS is cleared to accept the P-number and Q-number. Late in step 1, MAR is set up with the address, 01078, for use on step 2.

*Step 2.*—It is desired to read out the high order pair of digits of the P address of the transmit instruction, and write them into the high order positions of OR1. These two digits, 01, appear in memory locations 01078 and 01079; since MAR is set at 01078, an even address, the pair appears in MBRE and MBRO respectively. The content of even-addressed location 01078(0) passes through MBRE to DRU and thence along the 10,000's channel through all eight MARS registers. Since only OR1 is half-selected, the 10,000's position in OR1 will be set to zero. At the same time the 1 from memory location 01079 passes through MBRO and DRT along the 1000's channel through MARS, setting a 1 in the half-selected OR1 1000's position. Again, the incrementer is conditioned to increment-2; IR1 at this time contains 01080, which is set into MAR late in step 2.

*Step 3.*—Memory pair 01080 and 01081 is read out into MBRE and MBRO, and the contents are set into the 100's and 10's positions respectively of OR1. Selection of the 100's and 10's channels is accomplished by switching with the program timer and always occurs on step 3. The program timer also causes an increment-2, which loads IR1 with 01082, which is set into MAR late in step 3. OR1 at this time contains 01180.

*Step 4.*—MAR contains 01082. Switches set by the program timer, which controls the sequence of operations during each I-cycle, are set up to ignore the content of the odd memory location while passing the digit content of the even location to MBRE, MDR, DRU, and the units channel of MARS. The digit 4, which was in memory address 01082, is set into the units position of OR1, which at this time contains 01184. The program timer causes an increment-1 in step 4, setting IR1 to 01083, which is placed in MAR late in step 4.

*Step 5.*—MAR contains 01083. Note that this is an odd address. The format of the instruction word is such that the 10,000's position of the Q address is always in an odd location in memory; it is always paired with the units digit of the P address. When the two numbers are being set up in MARS, it is necessary to bring them together into MBRE and MBRO, respectively.

On Step 5 the contents of memory locations 01082 and 01083 appear in MBRE and MBRO, respectively. Since the memory address in MAR is odd, the content of MBRO passes through MDR to DRU, and, because of program timer switch setups, along the 10,000's channel through all the MARS registers, setting OR2 10,000's position (OR2 only being half-selected) to the high order Q-digit, Q5, which in the illustration is 0. OR2 at this time holds 00000. The program timer causes an increment-2 to 01085. IR1 now contains 01085, which is set in from MAR late in Step 5.

*Step 6.*—MAR now holds 01085. This being an odd address, its content and the content of the next lower even address are read out together into the MBR's. The even-addressed digit (1) goes through MBRE and the digit register 10's position, along the 1000's channel to set OR2 1000's position to 1. The odd digit (2) goes through MBRO, MDR, digit register units, and along the 100's channel through MARS to set OR2 100's position to 2. OR2 at this time holds 01200. The program timer forces an increment-2; IR1 now contains 01087, which is set into MAR late in Step 6.

*Step 7.*—MAR now contains 01087. The contents of memory locations 01087 and 01086 are read out into the MBR's. The even addressed digit (8) passes through MBRE, DRT, along the 10's channel to set OR2 10's position to 8. The odd addressed digit (4) passes through MBRO, MDR, DRU, along the units channel to set the (4) into OR2 units position. OR2 now holds 01284. The program timer forces an increment 1, incrementing IR1 to 01088.

*Step 8.*—This cycle is necessary to synchronize the program timer advance pulses. The fact that OPR is set up for a transmit instruction conditions step 8 circuits to drive OR1 content into MAR to begin execution of the transmit operation. MAR contains 00184, OR2 contains 01284 and IR1 contains 01088.

*Transmit instruction E-cycle*

*Step 1.*—The contents of memory location 00184 and its pair, memory location 00185, pass to the MBR's. Since this is an even address the MBRE content appears in MDR. The content of OR1 is incremented 1 and replaced in OR1 as 00185; OR2 content is unchanged. The content of memory location 00184(1!) is placed in MDR. Near the end of execute Step 1, the MBR's are reset as a part of the regeneration into memory; reset of MDR is blocked. Since this is a transmit field instruction, the content of MDR is continuously scanned for a record mark interpretation; if a record mark appears, the record mark trigger is set, which causes the transmit operation to stop and calls for the next instruction per IR1. In this case the content of MDR is not a record mark. At the end of Execute Step 1 MAR contains 01284; OR1 contains 00185; OR2 contains 01284; MBR contains 00; and MDR contains (1!). The content of IR1, the address of the next instruction, remains unchanged all during execute time.

*Step 2.*—MAR contains 01284, an even address. OPR retains its transmit instruction. Location 01284 and its pair, location 01285, are read out of memory and presented to MBRE and MBRO, respectively. MBRE, however, is blocked. The content of MBRO is merely carried along on this step. Simultaneously with the blocked attempt to load MBRE from memory, the content of MDR (1!) is being read into MBRE. The content of MBRE and MBRO (1!–random) are regenerated into memory addresses 01284 and 01285, respectively. An increment 1 is forced. Address 01284 now contains (1!); MAR contains 00185; OR1 contains 00185; and OR2 contains 01285.

*Step 3.*—This step is another step 1; however MAR contains odd address 01185, instead of an even address. At the end of the third step, MAR contains 01285, OR1 contains 00186; OR2 contains 01285; MBR contains 00; and MDR contains (2).

*Step 4.*—This is another step 2. MAR contains 01285. At the end of the fourth step, the memory record 01284 contains (1!2), MAR contains 00186; OR1 contains 00186; and OR2 contains 01286.

The transmit operation continues by reading out from memory to MDR on transmit step 1 steps, and storing into the transmit to locations on step 2 steps the data content of MDR.

The record mark taken from location 01205 is stored in location 01305 and the transmit operation is complete; IR1 is interrogated for the address of the next instruction, 01088, at which RD 00000 00300 is stored.

I-time follows the 8-step sequence described previously. E-time comprises one step per character read from paper tape, during which MDR is loaded from tape, its content passing to the selected location via MBRE or MBRO and the regeneration path. MAR selects the memory location—the read-out to MDR from memory is blocked, and the tape data from MDR placed in the selected location via the regeneration path. When the record mark at the end of the add table is sensed, the read paper tape operation is complete; IR1 is interrogated for the address of the next instruction, 01100, at which A01297–01300 is stored.

*Flag decoding—FIG. 6*

FIG. 6 is a consolidated block diagram showing the operation of several control triggers which respond to the flag. The flag is subject to various interpretations depending upon its position in the word in memory and the instruction involved. The flag may be:

(1) Ignored—during I-time in most instructions.

(2) Minus sign—at the units digit position of a field.

(3) Word Mark (End of field)—at any position in a field (other than the units digit position) the flag marks the high order position, defining the field, which may extend from two to hundreds of digits.

(4) Carry-with a digit read from the add table at step 3 in an Add sequence.

Flag plane 510 of the memory, flag trigger 511, program timer elements 512, 514, and network 515–524 of gates operate flag decoder triggers 525–532 upon coincidence of inputs, as follows:

| | |
|---|---|
| Flag **511**<br>First Cycle **531** | Minus Trigger **525**. |
| Not Flag **511**<br>First Cycle **531** | Plus Trigger **526**. |
| Flag **511**<br>Not First Cycle **531** | Plus Trigger **526**. |
| Not-I-time **528** | Word Mark Trigger **529** (**530**). |
| Word 1 (Word 2)<br>E-timer Add **512** Not step 3 | (End of Field). |
| E-timer Add **512** step 3<br>Or Divide steps 11, 22 | Carry Trigger **527**. |

Each flag decoder trigger continues to emit its function signal, once set, until reset, after which a complementary (not function) signal is emitted. E-timer 512 for addition shown in the block diagram has four steps; E-timers (i.e., 513 for multiply) for other instructions in which the flag has special meanings affect the flag decoder triggers similarly when operative. I-timer 514 is used for each instruction. At the end of I-time, the First Cycle trigger 531 is set. First Cycle 531 affects Minus trigger 525 and Plus trigger 526; if a flag appears in either the addend or augend units digit during readout in add steps 1 and 2, the flag is interpreted as a minus sign. If no flag appears, the not-flag function signal is interpreted as a plus sign. On step 3 of the add sequence for the units order, the First Cycle trigger is reset. Not First Cycle is significant in the recognition of the high order digit in addend and augend. Each field is at least two digits—a units order flag is a minus sign, and a flag in any higher order is the word mark.

*Add instruction*

Addition is performed by references to an add table set aside in memory. FIGURE 2 illustrates the add instructions. Unflagged digits appear alone in the boxes (locations); flagged digits indicate a carry and are indicated by exclamation points. The augend digit is used as the units digit of the address and the addend digit as the tens digit. A 3 is forced into the memory addressing means hundreds position as it addresses the add table which is placed at locations 300–399. Thus, in the addition of 3 to 4, the sum 7 appears at location 00334 as (7); in adding 7 to 8, the sum 15 appears in location 00378 as (5!).

*I-time.*—The instruction (A, $P_5P_4P_3P_2P_1Q_5Q_4Q_3Q_2Q_1$) is the subject of the usual 8-step I-time, during which OPR 501–502 and its decoder 503 set up the program timer for addition, OR1 is set to the Q-number, which is the addend field address, and OR2 is set to the P-number which is the augend field address. IR1 is set to the address of the next instruction; MAR is set to the P-number, which is the address of the addend units position. OR3 is also set to the P-number to retain the augend units address should recomplementing be necessary.

*E-time.*—The execution of an add instruction requires four steps per order, as follows:

*Step 1.*—Read-out addend digit from memory location specified by the content of OR1. Place digit in DRU. In shorter terms, "RO addend digit per OR1 to DRU." Decrement content of OR1.

*Step 2.*—RO augend digit per OR2 to MDR. Set MAR to 003 (augend digit) (addend digit plus carry).

*Step 3.*—RO memory add table per MAR to MDR, which accepts sum digit and flag for carry. Set carry trigger upon sensing flag.

*Step 4.*—RO augend digit location per OR2, blocking transfer to MDR, which retains sum digit. Set sum digit into augend digit location via an MBR and regeneration path. Decrement content of OR2.

The addition flows from low order to high order positions; i.e., units, tens, hundreds, etc. until the augend flag signals the completion of the operation.

Since the sum is stored in the augend location, the number of digits in the sum is equal to the number of digits in the augend. Any sums extending beyond the limits of the augend field would lose the high-order digits; an overflow is recognized should such a condition occur.

*Sample Program Add.*—Units Order

After I-time, the contents of the registers, memory, and carry trigger are as follows:

OPR—21
IR1—01112
OR1—01300
OR2—01297
MAR—01300
01300—(2!47)
01297—(7!890123)
Carry—Unset The changes which occur during addition steps for the units order are as follows:

Step 1: RO addend digit per OR1 through DRU and Bypass to MAR units; decrement content of OR1.

OR1—01299
DRU—(7)
MAR—00007

Step 2: RO augend digit per OR2 through MDR to MAR tens. Set OR3 per OR2 to retain augend field address on first cycle only:

MDR—(3)
MAR—00037

Step 3: RO memory add table per MAR to MDR. Add table location 00337 contains 0!. The hundreds order 3 is forced by impressing signals on the 1 and 2 bit lines during Add step 3, to address the add table at its selected place in memory. Set carry switch.

MDR—0!
Carry—Set

Step 4: RO augend digit location 01297 per OR2, blocking transfer of its content (3) to MDR, which retains the sum digit (0). Set sum digit (0) into augend units digit location 01297 via MBRO and regeneration path. Decrement content of OR2.

01297—(7!890120)
OR2—01296

*Sample Program Add.*—Tens Order

OR1—01299
OR2—01296
MAR—01299
(Addend) 01300—(2!47)
(Augend/Partial Sum) 01297—(7!89012/0)
Carry—Set Step 1: RO addend tens digit per OR1 through DRU and Plus-1 to MAR. Decrement content of OR1. Reset Carry Switch.

OR1—01298
DRU—(4)
MAR—00005
Carry—Unset

Step 2: RO augend tens digit per OR2 through MDR to MAR tens.

MDR—(2)
MAR—00025

Step 3: RO memory add table per MAR to MDR. Add table location 00325 contains 7. The hundreds order 3 is forced automatically.

MDR—(7)

Step 4: RO augend digit location 01296 per OR2, blocking transfer of its content (2) to MDR, which retains the sum digit (7). Set sum digit (7) into augend tens digit location 01296 via MBRE and regeneration path. Decrement content of OR2.

01297—(7!890170)
OR2—(01295)

*Sample Program Add.*—Hundreds Order

| | |
|---|---|
| | OR1—01298 |
| | OR2—01295 |
| | DRU—0 |
| | DRT—0 |
| | MAR—01298 |
| (Addend) | 01300—(2!47) |
| (Augend/Partial Sum) | 01297—(7!8901/70) |
| | Carry—Unset |

Step 1: RO addend hundreds digit per OR1 through DRU and bypass to MAR. Decrement content of OR1.

OR1—01297
DRU—(2)
MAR—00002

Step 2: RO augend hundreds digit per OR2 through DRT to MAR tens.

DRT—(1)
MAR—00012

Step 3: RO memory add table per MAR to MDR. Add table location 00312 contains 3. The hundreds order 3 is forced automatically.

MDR—(3)

Step 4: RO augend hundreds digit location 01295 per OR2, blocking transfer of its content (1) to MDR, which retains the sum digit (3). Set sum digit (3) into augend hundreds digit location 01295 via MBRO and regeneration path. Decrement content of OR2.

01297—(7!890370)
OR2—01294

*Sample Program Add.*—Addend Flag

The addend word mark flag is sensed during the operation on the hundreds order, setting Word-Mark 1 trigger. This trigger, when set, eliminates step 2 from remaining orders in the add sequence; further additions follow a sequence of steps 2–3–4.

*Sample Program Add.*—Thousands Order

| | |
|---|---|
| | OR1—01297 |
| | OR2—01294 |
| | DRU—0 |
| | DRT—0 |
| | MAR—01294 |
| (Addend) | 01300—(2!47) |
| (Augend/Partial Sum) | 01297—(7!890/370) |

Step 1: Eliminated.

Step 2: RO augend thousands digit (0) per OR2 through DRT to MAR tens position.

DRT—(0)
MAR—00000

Step 3: RO memory add table per MAR to MDR. Add table location 00300 contains (0).

MDR—(0)

Step 4: RO augend thousands digit location 01294 per OR2, blocking transfer of its content (0) to MDR, which retains the sum digit (0). Set sum digit into augend thousands digit location 01294 via MBRE and regeneration path. Decrement content of OR2.

01297—(7!890370)
OR2—01293

*Sample Program Add.*—Ten Thousands Order

| | |
|---|---|
| | OR1—01297 |
| | OR2—01293 |
| | DRU—0 |
| | DRT—0 |
| | MAR—01293 |
| (Addend) | 01300—(2!47) |
| (Augend/Partial Sum) | 01297—(7!89/0370) |

Step 1: Eliminated.

Step 2: RO augend ten thousands digit (9) per OR2 through DRT to MAR tens position.

DRT—(9)
MAR—00090

Step 3: RO memory add table per MAR to MDR. Add table location 00390 contains (9).

MDR—(9)

Step 4: RO augend ten thousands digit location 01293 per OR2, blocking transfer of its content (9) to MDR, which retains the sum digit (9). Decrement content of OR2. Set sum digit (9) into augend ten thousands digit location 01293 via MBRO and regeneration path.

01297—(7!890370)
OR2—01292

*Sample Program Add.*—Hundred Thousands Order

| | |
|---|---|
| | OR1—01297 |
| | OR2—01292 |
| | DRU—0 |
| | DRT—0 |
| | MAR—01292 |
| (Addend) | 01300—(2!47) |
| (Augend/Partial Sum) | 01297—(7!8/90370) |

Step 1: Eliminated.

Step 2: RO augend hundred thousands digit (8) per OR2 through DRT to MAR tens position.

DRT—(8)
MAR—00080

Step 3: RO memory add table per MAR to MDR. Add table location 00380 contains (8).

MDR—(8)

Step 4: RO augend hundred thousands digit location 01292 per OR2, blocking transfer of its content (8) to MDR, which retains the sum digit (8). Decrement content of OR2. Set sum digit (8) into augend hundred thousands digit location 01292 via MBRE and regeneration path.

01297—(7!890370)
OR2—01291

*Sample Program Add.*—Millions.

OR1—01297
OR2—01291
DRU—0
DRT—0
MAR—01292
(Addend) 01300—(2!47)
(Augend/Partial Sum) 01297—(7!/890370)

Step 1: Eliminated.

Step 2: RO augend millions digit (7) per OR2 through DRT to MAR tens position.

DRT—(7)
MAR—00070

Step 3: RO memory add table per MAR to MDR. Add table location 00370 contains (7).

MDR—(7)

Step 4: RO Augend millions digit location 01291 per OR2, blocking transfer of its content (7!) to MDR, which retains the sum digit (7). Decrement content of OR2. Set sum digit (7) into augend millions location 01291 via MBRO and regeneration path. The sum is complete.

*Sample Program Add.*—Augend Flag.

The augend word mark flag is sensed during the operation on the millions order, setting Word Mark 2 trigger. Should Word Mark 2 trigger be set while Word Mark 1 remains unset, an overflow condition results; the programming rules require that the augend field be larger than the addend field to accept the sum.

*Sign Control.*—FIG. 6.

A flag in the units order of a field denotes a minus sign for the number in the field; no flag denotes a plus sign. The plus and minus triggers cooperate with the operation decoder to provide sign control throughout the execution of the instruction.

Algebraic addition includes the addition of two numbers having like signs, and addition of two numbers having unlike signs, i.e., subtraction. The various combinations of plus and minus operands are recognized and treated according to the rules prescribed by the particular instruction involved, such as Add, Subtract, Multiply, etc.

*Sign table*

| | Add | | | | Subtract | | | | Multiply | | | |
|---|---|---|---|---|---|---|---|---|---|---|---|---|
| Possible | + | ± | ± | − | ± | + | − | ± | + | − | − | + |
| Augend/Minuend OR2 | + | + | − | − | + | + | − | − | + | + | − | − |
| Addend/Subtrahend OR1 | + | − | + | − | + | − | + | − | + | − | + | − |
| Forced Sign | + | − | − | − | − | + | − | − | + | − | − | + |
| T/C 408 (augend/minuend) | T | C | T | T | C | T | T | T | | | | |
| T/C 404 (addend/subtrahend) | T | T | C | T | T | T | T | C | | | | |
| Carry Out—Overflow or Minus | O | − | − | O | − | O | O | − | | | | |
| No Carry Out—Recomplement | | R | R | | R | | | R | | | | |
| Sign after Recomp | | + | + | | + | | | + | | | | |

T-True. C-Complement. O-Overflow. R-Recomplement.

*Subtract instruction*

*I-time.*—The instruction S P-number Q-number is the subject of the usual 8-step I-time, during which OPR and its decoder set up the program timer for subtraction, OR1 is set to the Q-number, which is the address of the units digit of the subtrahend and OR2 and OR3 are set to the P-number which is the address of the units digit of the minuend.

*E-time.*—Subtraction is accomplished by 10's complement addition. The execution of the subtract instruction requires four steps per order, as follows:

Step 1: RO subtrahend rigid per OR1 to DRU. Decrement OR1.

Step 2: RO minuend digit per OR2 to DRT. Set MAR to 003 (minuend digit) (subtrahend digit plus carry).

(Note: The minuend digit may be complemented before it is placed in MAR, depending upon the relative signs of the minuend and subtrahend, so that the add table may be used. The subtrahend digit, which also may be complemented, is modified for carry and placed in MAR units; the minuend digit or complement is placed in MAR tens. Since T/C's 404 and 408 are 9's complementers, a carry is always forced into the units order to create the 10's complement. A minus flag is also forced in — or ± situations.)

Step 3: RO memory add table per MAR to MDR which accepts difference digit and flag for carry. Set carry trigger upon sensing flag.

Step 4: RO minuend digit location per OR2, blocking transfer to MDR, which retains difference digit. Set difference digit into minuend digit location via MBR and regeneration path. Decrement OR2.

Subtraction being accomplished by 10's complement addition, a recomplementing operation is necessary if there is no carry from the high order position in any ± situation, i.e., in any add operation where the signs of addend and augend are initially different and the sum is positive; or in any subtract operation where the signs of subtrahend and minuend are alike and the difference is positive. When a carry out of the high order position occurs, it is used merely for sign control, since 10's complement subtraction does not use end-around carry.

*Sample Program Subtract.*—Units Order

After I-time, the contents of the registers, memory, and carry trigger are as follows:

OPR—22
IR1—01124
OR1—01304
OR2—01302 OR3—01302
PR1—01304
MAR—01304
(Subtrahend) 01304—(0!2)
(Minuend) 01302—(0!3)

The minued is complemented as a result of the subtract instruction and the like signs of the operands; T/C 408 is effective throughout the subtract sequence.

Step 1: RO subtrahend units digit (2) per OR1 to DRU. Decrement OR1 content.

DRU—(2)
OR1—01301

Step 2: RO minuend units digit (3) per OR2 to DRT. Set MAR to 003 (minuend units digit 9's complement) (subtrahend units digit plus forced carry). OR3 has been set to retain minuend field address should recomplementing be necessary.

DRT—(3)
MAR—00363

Step 3: RO memory add table location 00363 per MAR to MDR. Add table location 00363 contains 9. MDR accepts difference digit 9.

Step 4: RO minuend units digit location 01302 which contains (3), per OR2, blocking transfer to MDR, which retains difference digit (9). Set difference digit (9) in minuend units digit location 01302. Decrement OR2.

01302 (0!9!)
OR2 01301

*Sample Program Subtract.*—Tens Order

OR1—01303
OR2—01301
Carry Trigger—Set
(Subtrahend) 01304—(0!2)
(Minuend/Partial Difference) 01302 (0!/9!)

Step 1: RO subtrahend tens digit (0) per OR! to DRU. Decrement OR2 content.

DRU—(0!)
OR1—01300

Step 2: RO minuend tends digit (0!) per OR2 to DRT. Set MAR to 003 (minuend tens digit 9's complement) subtrahend tends digit plus carry).

003 (9) (0)
MAR 00390

Step 3: RO memory add table location 00390 per MAR to MDR. Add table location 00390 contains 9. MDR accepts difference digit 9.

MDR (9)

Step 4: RO minuend tens location 01301. Decrement OR2. Set difference digit (9) in minuend tens digit location 01301.

01302—(9!9!)
OR2—(01301)

*Sample Program Subtract.*—Subtrahend and Minuend Flag.

The word mark flag for both operands is sensed during the tens order subtract operation, setting the word mark triggers. The carry trigger is unset—therefore a recomplement sequence is necessary to return the difference to true form.

*Recomplement*

Recomplementing, when necessary, is accomplished as follows:

The address of the units position of the augend/sum is stored during I-time in OR3. Should recomplementing be determined necessary, the program timer forces a recomplement program of add steps 2–3–4 until the word mark appears. Since this is a complement add, the units order receives a forced carry to provide the tens complement and a flag reset to show that the sum is positive. In the sample program, the arithmetic operation is as follows:

*Units*

```
        6  minuend (9's complement of 3)
        2  subtrahend
        1! forced carry and flag
        —
        9!
Tens    9  minuend (9's complement of 0)
        0  subtrahend
        !  forced flag
        —
        9!9! algebraic sum (Complement form – – –
             flag forced as word mark)
```

Failure to carry from the high order signals the need to recomplement, which occurs in the following manner:

*Units*

```
        0  algebraic sum (9's complement of 9!)
        1  forced carry
        —
        1
Tens    0  algebraic sum (9's complement of 9!)
        !  no carry. Flag forced as word mark
        —
        0! correct algebraic sum and sign.
```

*Flag Controlled Branch Instruction.*—At the end of the recomplement operation, the field at 01302 contains (0!1), signifying a +1 value. The sample program includes, as program step 7, a "Branch No Flag" instruction. This instruction is effective to control branching on negative values, branching on word marks, and any other occurrence of the flag including one set by means of a previous SF (Set Flag) instruction.

The flag indicating the minus sign of the field at 1302 prevents the branch, and the sample program proceeds to the next instruction.

FIG. 7 is a diagram of the E-timer for addition. Four step blocks 541–544 and a looper 545 condition command signal lines designated read addend digit 546, read augend digit 547, read add table 548 and write sum 549. Command lines are marked with figure numbers where a more intensive description is given.

The programming rules specify that the augend digit length be equal to or greater than the addend digit length. Upon recognition of the augend word mark, looper 545 bypasses add step 1 block 541 for the remainder of the operation, during which carries are applied to the higher order augend digits as they are brought down.

SECTION E—DIVIDE

Division is accomplished by over-and-over table lookup subtraction. More precisely, division is accomplished by reduction cycles of over-and-over table lookup complement add sequences with comparison after each add sequence to determine whether or not the remainder has gone minus. If the remainder has gone minus, the reduction cycle is terminated by an add back cycle. The quotient is developed and stored, the divisor is added back and "shifting" is accomplished to take a second shift reduction cycle from the dividend. The operation is much like normal long division methods used by humans. The quotient is developed by a table lookup based upon a quotient digit address which is incremented by 1 after each positive remainder table lookup complement add sequence. The divide program comprises the following distinct portions:

FIGS. 9, 10—Lineup.
FIGS. 11, 12—Subtract.
FIGS. 13, 14—Add back.

During lineup, the variable-length dividend and divisor are scanned to line up the high orders, and consequently other orders, for the initial reduction cycle. During subtract, the divisor is subtracted from the dividend, the remainder is tested and, where the remainder is positive, the process is repeated. The series of subtractions finally is determined to have driven the remainder negative. When the negative remainder is sensed, the reduction cycle is terminated and the add back cycle is taken. The dividend is tested for a low order flag for the end divide decision. If the dividend (remainder) is not yet at the low order, the divisor is added back and "shifting" occurs so that significant digits of the remainder are aligned for subtraction. The program then switches to subtract and another reduction cycle is taken. When the dividend flag appears, the end divide decision is made, and the quotient sign is inserted. When the high order dividend flag is sensed, the program switches to I-time for the following instruction.

*Rules for division*

*Programming.*—(1) Number of digits in dividend must be greater than number of digits in divisor.

(2) Where (N) is the absolute value of the divisor with $n$ digits and M is the $n$ leftmost digits of the dividend, then $(M) \leqq (N)$.

(3) Number of digits in the quotient must $\geqq 2$ and is equal to the number of digits in the dividend plus one, minus the number of digits in the divisor.

*Internal Operation.*—Quotient sign is determined during lineup. After lineup, the dividend low order digit always includes a flag and the divisor low order digit never includes a flag.

MARS registers are assigned as follows:

IR1 Instruction Address
IR2 (Reserved for Branch Address)
OR1 Divisor Address
OR2 Dividend Address
OR3 Divisor Address Initializing
PR1 Quotient Accumulator Address
PR2 Partial Dividend Address Initializing
PR3 Quotient Digit Address

*FIG. 9—Lineup.*—During I-time for divide the address of the divisor is placed in OR1 and the address of the dividend in OR2. The address of the succeeding instruction is in IR1. On program step 1, fixed address mechanisms set PR1 equal to 00080 (the high order digit position of the accumulator area) and PR3 equal to 00300 (the add table address for the sum of 0 and 0, which is 0). PR1 addresses the accumulator area in memory and controls positioning of quotient digits. PR3 addresses the 0+0 position of the add table. The quotient is developed in the accumulator area of memory with its high order at position 00080. The value of particular digits of the quotient is derived by table lookup according to the value set in PR3. For example, should PR3 be set to 00304, the quotient digit is that digit contained in add table position 00304, which is 4.

During step 2 the dividend digit is read out to the memory data register per the address contained in OR2, and OR2 is decremented. High order dividend decide block 32 determines, from the presence or absence of a flag and the setting of the first cycle trigger, whether to return to step 2, step 3 or step 4. Details of high order dividend decide block 32 (FIG. 9) appear in FIG. 10, as A-blocks 41–44. A-block 41 is effective to reset the first cycle trigger and to set step 3 upon coincidence of NO FLAG, STEP 2 and FIRST CYCLE functional signals. This occurs when the dividend is positive. Lineup step 3 in FIG. 9 sets the flag and corrects parity so that thereafter the dividend appears with a low order flag. The low order flag is used for the end divide decision. Step 3 then passes control back to step 2 to read out the second order of the dividend. High order dividend decide block 32 passes control back to step 2 on each cycle until the high order flag is scanned. A-block 43 in FIG. 10 is effective to set step 2 upon coincident conditioning by functional signals STEP 2, NOT FIRST CYCLE and NO FLAG. The machine remains in step 2 as it steps through the dividend until the high order is reached.

A-block 44 is effective to recognize the high order position of the dividend by functional signals STEP 2, NOT FIRST CYCLE and FLAG to provide functional signal SET FIRST CYCLE trigger and SET 4. Step 4 increments the OR2 addresses by 1. The OR2 address, at the beginning of the sequence to line up the divisor, is the address of the high order digit of the dividend. As this address is incremented it becomes the address of the next lower order of the dividend. As each order of the divisor is recognized, and its address made available, the address of the effective order of the dividend is incremented by 1. The effect of this procedure is to determine the address of the order of the dividend which matches the low order of the divisor when high orders of the dividend and divisor are lined up. An example follows:

Dividend (7!654321)
OR2 04384
Divisor (8!43)
OR1 04387 OR3 04387

Dividend (7!654321)
OR2 04378
Divisor (8!43)
OR1 04387

Dividend (7!654321)
OR2 04379
Divisor (8!43)
OR1 04386

Dividend (7!654321)
OR2 04380
Divisor (8!43)
OR1 04385

SET OR1=OR3

Dividend (7!654321)
OR2 04380
Divisor (8!43)
OR1 04387

Step 5 is read out divisor digit to MDR per OR1 and decrement 1 OR1. Step 5 always follows step 4, but they cannot be consolidated conveniently into one step for reasons of conflict in MARS. Step 5 is followed by high order divisor decide block 34 which, on the first cycle, scans the flag for sign. If there is no flag, the divisor is positive, and control passes back to step 4. If there is a flag, the divisor is negative, and to fulfill the rules of division the flag must be cleared. Control thus passes to step 6 which clears the flag, corrects parity and returns to step 4. Thereafter, block 34 passes control back to step 4 repetitively until the divisor high order digit is recognized. Step 4, during this period, has been incrementing OR2 upon each divisor digit, so that the OR2 address is the lineup address for the partial dividend. The lineup address of the divisor retains its low order address which is available from OR3. Upon recognition of the high order flag, high order divisor decide block 34 passes control to step 7.

Step 7 sets OR1 equal to OR3 to return OR1 to the address of the initial order of the divisor. Step 8 sets PR2 equal to OR2, placing the lineup address of the dividend into PR2, and sets the first cycle trigger. Control then passes to the subtract portion of the divide program, step 9 in FIG. 11.

*Lineup Decisions—FIG. 10.*—At step 2 of the first cycle there is no minus sign flag in the dividend. A-block 41 is thus conditioned to reset the first cycle trigger and set step 3. Step 3 is taken as a matter of course, followed by another step 2. On the second step 2 it is not the first cycle and there is no flag, which conditions A-block 43 to set step 2 for another operation. On the third step 2 operation, the high order flag appears, conditioning A-block 44 which sets the first cycle trigger and sets step 4. Step 4 is followed as a matter of course by step 5, which on the first cycle is unaccompanied by a flag, conditioning A-block 45 to set step 4 again and to reset the first cycle trigger. Step 4 is taken again, followed as a matter of course by a second step 5. On this step 5, the divisor high order flag appears, conditioning A-block 48 which sets step 7. Neither A-block 42 nor A-block 46 is conditioned; the quotient negative trigger 49 remains in the reset condition, presenting at its lower output the functional signal QUOTIENT POSITIVE.

A-block 41, as previously described, resets the First Cycle trigger by a signal or RESET FIRST CYCLE line A and sets step 3 upon coincidence of NO FLAG, STEP 2 and FIRST CYCLE. The First Cycle trigger appears in FIG. 14. Its purpose is to recognize a positive dividend and initiate step 3 to convert the dividend to the low order flag dividend required by the rules of division.

A-block 42 is conditioned by coincident functional signals STEP 2, FIRST CYCLE and FLAG. It thus recognizes the dividend low order flag (minus sign). The low order flag is necessary according to the rules of division. It produces functional signals RESET FIRST CYCLE TRIGGER, SET 2, and a signal to flip Quotient Negative trigger 49 from the reset condition to the quotient negative condition. Quotient Negative trigger 49 remains set to negative until reset or until flipped back to quotient positive as a result of a negative divisor. The binary operation of the quotient Negative trigger thus causes it to fulfill the rules of division, as follows:

$$-\div-=+;\ -\div+=-;\ +\div-=-;\ +\div+=+.$$

A-block 43 is effective to set step 2 upon coincident functional signal STEP 2, NOT FIRST CYCLE and NO FLAG. It thus causes a tight loop in step 2 to pass through all positions of the dividend other than the first and last positions.

A-block 44 is effective upon coincidence of functional signals STEP 2, NOT FIRST CYCLE and FLAG to set step 4 and set the First Cycle trigger. A-block 44 thus recognizes the high order dividend position, passes control to step 4 which is the initial step of the divisor lineup sequence, and sets the first cycle trigger to enable the divisor lineup sequence to recognize its low order minus sign flag if present.

A-block 45 is effective upon coincidence of functional signals STEP 5, NO FLAG and FIRST CYCLE to set 4 and to reset the First Cycle trigger. A-block 45 thus recognizes the low order digit of a positive divisor and passes control back to step 4 to skip through the divisor to find a high order. A-block 46 is effective upon coincidence of functional signals STEP 5, FLAG and FIRST CYCLE to flip the Quotient Negative trigger 49, to set step 6 and to reset the First Cycle trigger. A-block 46 thus recognizes the negative divisor, flips the Quotient Negative trigger to negative (or back to positive if it has already been flipped during dividend lineup) and passes control to step 6. Step 6 clears the flag and corrects parity to make the divisor conform with the division rules.

A-block 47 is effective upon coincidence of functional signals STEP 5, NOT FIRST CYCLE and NO FLAG to set step 4. It controls a two-step loop (4 and 5) to pass through all positions of the divisor other than the low order and the high order.

A-block 48 is effective upon coincidence of functional signals STEP 5, NOT FIRST CYCLE and FLAG to recognize the high order divisor digit and to set step 7. In FIG. 9, step 7 passes control to step 8 which passes control out of the lineup operation sequence.

Reviewing the operation, lineup thus involves twelve steps for a three-digit dividend and two-digit divisor. At the end of the lineup operation sequence, MARS registers are set with the dividend and divisor lineup addresses for a reduction cycle. The quotient sign has been determined, and in the example is positive. The Quotient Negative trigger was reset at step 1 and never set thereafter. Step 6 has been omitted; this step is unnecessary when the divisor is positive.

*FIG. 11—Subtract.*—Divide steps 9, 10, 11 and 12 are table lookup add steps corresponding with the table lookup add sequence as indicated in FIG. 7. and corresponding specification. The divisor and dividend were lined up for the reduction cycle during steps 1–8 in the lineup sequence. On step 9, the divisor digit is read out to the digit register units per OR1 and OR1 is decremented. On step 10, the dividend digit is read out to MDR and the complement of the divisor digit is gated to MAR. On the first cycle only, this occurs through the +1 switch since the end-around carry is assumed. The carry trigger is reset. On step 11 the difference digit is read out from the add table to MDR per MAR. The first cycle trigger is reset on step 12. On cycles other than the first cycle, the first cycle trigger is in the reset state anyway, but the additional reset does no harm. On step 12, the difference digit is stored per the address of OR2 and OR2 is decremented. Step 12 terminates the table hookup add sequence and passes control through the subtract complete decision block 35 which checks for the high order flag. The dividend at this point must always be equal in number of digits or greater in number of digits than the divisor. Where neither the divisor word mark nor the dividend word mark has been reached, control returns to step 9 for a complete table lookup subtraction. Where the divisor word mark has been reached, control goes to step 10 which in effect subtracts the 0 from the extra dividend order. When both high order flags, that is, both word marks are recognized the remainder minus decision block 36 becomes effective. Remainder minus decision block 36 checks for a no carry out which indicates a minus remainder. Until the minus remainder condition is recognized, remainder minus decision block 36 passes control to step 13 which increments the quotient address in PR3 by 1. This incrementing of the quotient address has the effect of making available the addresses of the series of digits 0 1 2 3 . . . 9; the quotient address specifies the add table digit equal to the number of subtractions in the reduction cycle. Step 14 sets OR1 equal to OR3 to address the low order digit of the dividend. Step 15 sets OR2 equal to PR2 to address the low order digit of the divisor which thus is aligned with the lineup order of the dividend for an additional subtrct cycle at the same lineup position. Step 15 also sets the first cycle trigger for the next subtract cycle.

Remainder minus decision block 36, when it recognizes that the remainder has gone minus from the no-carry out of the high order, passes control to step 16. On step 16 the quotient digit is read out to MDR from the add table address specified by PR3. PR3, which has been incremented upon each of the successful subtractions of the reduction cycle, addresses the add table digit equal to the number of subtractions and thereby produces the quotient digit. Step 17 stores the quotient digit from MDR in the address specified by PR1. PR1 holds the address of a location in the accumulator area in memory. PR1 is incremented to address the next lower order of the accumulator. Step 18 sets OR2 equal to PR2 which initializes divisor address.

The end divide decision block 37 determines whether to end division by going to step 29 or to correct the now-negative dividend remainder through an add back cycle and continue reduction cycles. Should the decision be to end divide, and the quotient have been determined negative, step 29 flags the quotient and corrects parity by reading out the low order address of the quotient per OR2 to MDR and introducing the flag and the parity correction before the applicable memory location is regenerated. Step 29 is omitted where the quotient is positive. Control passes to step 30, which sets a flag into location 00080 to identify the quotient high order digit and correct parity. Control then passes to the I-timer 514 for the next instruction.

End divide decision block 37, on cycles other than the end divide decision, passes control to the add back section step 19.

*FIG. 12—Subtract Decisions.*—A-block 50 is effective upon coincidence of functional signals NOT WORD MARK 1, WORD MARK 2 and STEP 12. A-block 50 thus indicates an overflow whenever the number of digits in the divisor is greater than the number of digits in the dividend, a violation of the division rules. A-block 51 is effective upon coincidence of functional signals WORD MARK 1, WORD MARK 2 and STEP 12 to set step 10. This provides for bringing down the high order dividend digit whenever the divisor is made up of fewer digits than the partial dividend.

A-block 52 is effective upon coincidence of WORD MARK 1, WORD MARK 2 and STEP 12 to condition one input each of remainder minus decision A-blocks 57 and 58. A-block 57, when conditioned by the CARRY functional signal, sets step 13. A-block 58, when conditioned by the NO CARRY OUT functional signal, sets step 16. A-blocks 57 and 58 thus form remainder minus decision block 36 of FIG. 11. They pass control to step 13 for additional subtract cycles where the remainder remains positive or pass control to step 16 whenever the remainder goes minus.

A-block 53 is effective upon coincident conditioning by STEP 12, NOT WORD MARK 1 and NOT WORD MARK 2 to set step 9. This returns control to step 9 for a subsequent full subtract operation during the reduction cycle.

A-block 54 is effective upon coincident conditioning by functional signals STEP 10, FIRST CYCLE and FLAG to set End Divide trigger 55 which is initially reset during I-time. End Divide trigger 55 maintains the NOT END functional signal until set. When set it produces the END divide signal. END, together with functional signals STEP 18 and QUOTIENT NEGATIVE conditions A-block 59 to set 29, which sets a minus sign flag in the dividend low order.

A-block 56, in response to functional signals QUOTIENT POSITIVE, STEP 18 and END DIVIDE, sets step 30 which sets a high order flag for the quotient in accumulator location 00080.

Reviewing again, Subtract Decision operations; there is no overflow; A-block 50 remains deconditioned. On the first execution of step 12, A-block 53 is conditioned by functional signals STEP 12, NOT WM 1 and NOT WM 2. Sequence control returns to step 9 for a second order digit subtraction. On the second execution of program step 12, A-block 52 is conditioned by functional signals STEP 2, WM 1 and WM 2 and, because there is no carry out, conditions A-block 58 to set 16. Program steps 16, 17 and 18 follow as a matter of course and set up for the end divide decision.

End Divide trigger 55 starts the divide operation in the reset or not end condition. The dividend retains a low order flag provided during lineup. A-block 54 scans each step 10 for the combination of FIRST CYCLE and FLAG to set the End Divide trigger when the low order flag appears. In the example program, divide has not yet reached the condition for end divide; operations have been at the high end of the dividend. Accordingly, at step 18, A-block 60 is conditioned to set step 19 and to set the First Cycle trigger.

*FIG. 13—Add Back.*—Step 19 begins the add back sequence, which effects the desired purpose of returning the dividend to the positive condition after the dividend has gone below zero.

Step 19 sets OR1 equal to OR3 in initialize the dividend address register and then passes control to step 20. Steps 20–23 provide for a standard table lookup add operation to add the divisor to the partial dividend. At this point the partial dividend is a negative number of absolute value less than the divisor, stored as a nines complement. Step 20 reads the divisor digit to DRU per OR1 and decrements OR1. Step 21 reads the dividend digit to MAR per OR2 and, late in the cycle, gates the divisor digit to MAR. Step 22 reads out the sum digit from the add table to MDR per MAR and resets the first cycle trigger. Step 24 stores the sum digit from MDR per OR2 and decrements OR2. End add back decision block 39 (see A-blocks 61–63 in FIG. 14) passes control back to step 20 for an ordinary next order add cycle or to step 21 for an add cycle after the divisor has been exhausted. It scans the word mark triggers and where both divisor and dividend high order digits have been recognized passes control to the high order zero decision logic block 40. If the high order digit of the partial dividend is not 0, control passes to step 26. If the high order digit is 0, control passes to step 24 which increments OR2 by 2 and passes control to step 25. Step 25 sets the flag and corrects parity per OR2 and passes control to step 26. High order zeros are thus eliminated from the dividend by the placement of additional high order flags in the various high order dividend digit locations as they are driven to zero which thus prevents unnecessary reduction cycles.

Steps 26–28 initialize for another subtract reduction cycle. Step 26 sets OR1 equal OR3; step 27 increments PR2; step 28 sets OR2 equal to PR2 and sets the first cycle trigger. Step 28 passes control to step 9 in the subtract sequence as shown in FIG. 11.

*FIG. 14—Add Back decisions.*—A-block 61–63 form end add back decision logic block 39 shown in FIG. 13. A-block 61 is conditioned by coincident functional signals NOT WM 1, STEP 23 and NOT WM 2 to set step 20. A-block 62 is conditioned by coincident functional signals STEP 23, WM 1 and NOT WM 2 to set step 21. A-block 63 is conditioned by coincident functional signals STEP 23, WM 1 and WM 2 to set the flag and to provide an input to A-block 64.

High order zero decision logic block 40 of FIG. 13 comprises extended A-block 64 and I-block 65. A-block 64 is conditioned by the zero digit bit structure in MDR 608 and the output of A-block 63 to provide a functional signal SET 24 and, by inverter 65, provide functional signal SET 26 upon non-zero MDR.

The First Cycle trigger input circuit is also shown in FIG. 14. –O-block 66, which is extended to provide for multiple inputs, sets First Cycle trigger 68 wherever desired by connections to other logic. –O-block 67 resets First Cycle trigger 68 whenever conditioned by other logic.

*Sample Program Divide.*—In the sample program given at pages D11–12, it is assumed that instruction 9, stored at instruction locations 01148–01159, is a divide instruction D01200–01202 and that locations 01201–01202 contain (5!3). The significance of this instruction is to divide the P field (the word stored in the field addressed by 01200) by the Q field (the word addressed by 01202). The actual data involved is (2!47) and (5!3). The desired quotient, derived by human division methods is 4 with a remainder of 35.

The progress of the computer, in performing the desired division, is followed in exact detail including the data manipulations.

*Lineup—FIG. 9.*—At the end of I-time for divide, the settings are as follows:

| MARS | Registers | Memory |
|---|---|---|
| IR1 01160<br>OR1 01202<br>OR2 01200<br>OR3 01202<br>PR1 -----<br>PR2 -----<br>PR3 ----- | First Cycle 01160<br>Trigger—Set 01202<br>01200 | H 00000–00000<br>(5!3)<br>(2!47) |

IR1 retains the address of the next instruction throughout divide.

STEP 1

| MARS | Registers | Memory |
|---|---|---|
| OR1 01202<br>OR2 01200<br>OR3 01202<br>PR1 00080<br>PR2 -----<br>PR3 00300 | Quotient Negative—Reset | 01202 (5!3)<br>01200 (2!47) |

STEP 2

| MARS | Registers | Memory |
|---|---|---|
| OR1 01202<br>OR2 01199<br>OR3 01202<br>PR1 00080<br>PR2 -----<br>PR3 00300 | MDR (7)<br>First Cycle Trigger—Reset | 01202 (5!3)<br>01200 (2!47) |

Decision—Units order positive; go to step 3.

STEP 3

| MARS | Registers | Memory |
|---|---|---|
| OR1 01202<br>OR2 01199<br>OR3 01202<br>PR1 00080<br>PR2 -----<br>PR3 00300 | MDR (7)<br><br>Go to step 2. | 01202 (5!3)<br>01200 (2!47!) |

STEP 2

| MARS | Registers | Memory |
|---|---|---|
| OR1 01202<br>OR2 01198<br>OR3 01202<br>PR1 00080<br>PR2 -----<br>PR3 00300 | MDR (4)<br>Decision—Not high order; return to step 2. | 01202 (5!3)<br>01200 (2!47!) |

STEP 2

| MARS | Registers | Memory |
|---|---|---|
| OR1 01202<br>OR2 01197<br>OR3 01202<br>PR1 00080<br>PR2 -----<br>PR3 00300 | MDR (2!)<br>First Cycle—Set<br>Decision—High order; go to step 4. | 01202 (5!3)<br>01200 (2!47!) |

STEP 4

| MARS | Registers | Memory |
|---|---|---|
| OR1 01202<br>OR2 01198<br>OR3 01202<br>PR1 00080<br>PR2 -----<br>PR3 00300 | First Cycle-Set<br>Go to step 5. | 01202 (5!3)<br>01200 (2!47!) |

STEP 5

| MARS | Registers | Memory |
|---|---|---|
| OR1 01201<br>OR2 01198<br>OR3 01202<br>PR1 00080<br>PR2 -----<br>PR3 00300 | First Cycle—Reset<br>MDR (3)<br>Decision—Units order, positive; Omit step 6; return to step 4. | 01202 (5!3)<br>01200 (2!47!) |

STEP 4

| MARS | Registers | Memory |
|---|---|---|
| OR1 01201<br>OR2 01199<br>OR3 01202<br>PR1 00080<br>PR2 -----<br>PR3 00300 | | 01202 (5!3)<br>01200 (2!47!) |

STEP 5

| MARS | Registers | Memory |
|---|---|---|
| OR1 01200<br>OR2 01199<br>OR3 01202<br>PR1 00080<br>PR2 -----<br>PR3 00300 | MDR (5!)<br>Decision—High order; Go to step 7. | 01202 (5!3)<br>01200 (2!47!) |

STEP 7

| MARS | Registers | Memory |
|---|---|---|
| OR1 01202<br>OR2 01199<br>OR3 01202<br>PR1 00080<br>PR2 -----<br>PR3 00300 | Go to step 8. | 01202 (5!3)<br>01200 (2!47!) |

STEP 8

| MARS | Registers | Memory |
|---|---|---|
| OR1 01202<br>OR2 01199<br>OR3 01202<br>PR1 00080<br>PR2 01199<br>PR3 00300 | First Cycle Trigger—Set<br>Go to step 9. | 01202 (5!3)<br>01200 (2!47!) |

STEP 9

| MARS | Registers | Memory |
|---|---|---|
| OR1 01201<br>OR2 01199<br>OR3 01202<br>PR1 00080<br>PR2 01199<br>PR3 00300 | DRU (3)<br>Go to step 10. | 01202 (5!3)<br>01200 (2!47!) |

STEP 10

| MARS | Registers | Memory |
|---|---|---|
| OR1 01201<br>OR2 01199<br>OR3 01202<br>PR1 00080<br>PR2 01199<br>PR3 00300 | MDR (4)<br>MAR 00347<br>Go step 11. | 01202 (5!3)<br>01200 (2!47!) |

STEP 11

| MARS | Registers | Memory |
|---|---|---|
| OR1 01201<br>OR2 01199<br>OR3 01202<br>PR1 00080<br>PR2 01199<br>PR3 00300 | MDR (1!)<br>First Cycle Trigger—Reset<br>Carry Trigger—Set<br>Go to step 12. | 01202 (5!3)<br>01200 (2!47!) |

STEP 12

| MARS | Registers | Memory |
|---|---|---|
| OR1 01201<br>OR2 01198<br>OR3 01202<br>PR1 00080<br>PR2 01199<br>PR3 00300 | Decision—Subtract not complete;<br>Go back to 9. | 01202 (5!3)<br>01200 (2!17!) |

STEP 9

| MARS | Registers | Memory |
|---|---|---|
| OR1 01200<br>OR2 01198<br>OR3 01202<br>PR1 00080<br>PR2 01199<br>PR3 00300 | MDR (5!)<br>DRU (5)<br>WM 1 Trigger—Set<br>Go to step 10. | 01202 (5!3)<br>01200 (2!17!) |

STEP 10

| MARS | Registers | Memory |
|---|---|---|
| OR1 01200<br>OR2 01198<br>OR3 01202<br>PR1 00080<br>PR2 01199<br>PR3 00300 | MDR (2!)<br>MAR 00325<br>Carry Trigger—Reset<br>WM 2 Trigger—Set<br>Go to step 11. | 01202 (5!3)<br>01200 (2!17!) |

STEP 11

| MARS | Registers | Memory |
|---|---|---|
| OR1 01200<br>OR2 01198<br>OR3 01202<br>PR1 00080<br>PR2 01199<br>PR3 00300 | MDR (7)<br>Go to step 12. | 01202 (5!3)<br>01200 (2!17!) |

STEP 12

| MARS | Registers | Memory |
|---|---|---|
| OR1 01200<br>OR2 01197<br>OR3 01202<br>PR1 00080<br>PR2 01199<br>PR3 00300 | Decision—Subtract complete;<br>Decision—Remainder Minus;<br>Go to step 16. | 01202 (5!3)<br>01200 (7!17!) |

STEP 16

| MARS | Registers | Memory |
|---|---|---|
| OR1 01200<br>OR2 01197<br>OR3 01202<br>PR1 00080<br>PR2 01199<br>PR3 00300 | MDR (0)<br><br>Go to step 17. | 01202 (5!3)<br>01200 (7!17!)<br>00080 (xxxxx . . . x) |

STEP 17

| MARS | Registers | Memory |
|---|---|---|
| OR1 01200<br>OR2 01197<br>OR3 01202<br>PR1 00081<br>PR2 01199<br>PR3 00300 | Go to step 18. | 01202 (5!3)<br>01200 (7!17!)<br>Accum. (0xxxx . . . x) |

STEP 18

| MARS | Registers | Memory |
|---|---|---|
| OR1 01200<br>OR2 01199<br>OR3 01202<br>PR1 00081<br>PR2 01199<br>PR3 00300 | Decision—Not end divide; Go to step 19. | 01202 (5!3)<br>01200 (7!17!)<br>Accum. (0xxxx . . . x) |

STEP 19

| MARS | Registers | Memory |
|---|---|---|
| OR1 01202<br>OR2 01199<br>OR3 01202<br>PR1 00081<br>PR2 01199<br>PR3 00300 | Go to step 20. | 01202 (5!3)<br>01200 (7!17!)<br>Accum. (0xxxx . . . x) |

STEP 20

| MARS | Registers | Memory |
|---|---|---|
| OR1 01201<br>OR2 01199<br>OR3 01202<br>PR1 00081<br>PR2 01199<br>PR3 00300 | MDR 3<br>DRU 3<br><br>Go to step 21. | 01202 (5!3)<br>01200 (7!17!0)<br>Accum. (0xxxx . . . x) |

STEP 21

| MARS | Registers | Memory |
|---|---|---|
| OR1 01201<br>OR2 01199<br>OR3 01202<br>PR1 00081<br>PR2 01199<br>PR3 00300 | MAR 00313<br><br>Go to step 22. | 01202 (5!3)<br>01200 (7!17!)<br>Accum. (0xxxx . . . x) |

STEP 22

| MARS | Registers | Memory |
|---|---|---|
| OR1 01201<br>OR2 01199<br>OR3 01202<br>PR1 00081<br>PR2 01199<br>PR3 00300 | MDR (4)<br><br>Go to step 23. | 01202 (5!3)<br>01200 (7!17!)<br>Accum. (0xxxx . . . x) |

STEP 23

| MARS | Registers | Memory |
|---|---|---|
| OR1 01201<br>OR2 01198<br>OR3 01202<br>PR1 00081<br>PR2 01199<br>PR3 00300 | Decision—Not end add back; Go back to step 20. | 01202 (5!3)<br>01200 (7!47!)<br>Accum. (0xxxx . . . x) |

STEP 20

| MARS | Registers | Memory |
|---|---|---|
| OR1 01200<br>OR2 01198<br>OR3 01202<br>PR1 00081<br>PR2 01199<br>PR3 00300 | MDR (5)<br>DRU (5)<br><br>Go to step 21. | 01202 (5!3)<br>01200 (7!47!)<br>Accum. (0xxxx . . . x) |

STEP 21

| MARS | Registers | Memory |
|---|---|---|
| OR1 01200<br>OR2 01198<br>OR3 01202<br>PR1 00081<br>PR2 01199<br>PR3 00300 | MAR 00375<br><br>Go to step 22. | 01202 (5!3)<br>01200 (7!47!)<br>Accum. (0xxxx . . . x) |

STEP 22

| MARS | Registers | Memory |
|---|---|---|
| OR1 01200<br>OR2 01198<br>OR3 01202<br>PR1 00081<br>PR2 01199<br>PR3 00300 | MDR (2)<br><br>Go to step 23. | 01202 (5!3)<br>01200 (7!47!0)<br>Accum. (0xxxx . . . x) |

STEP 23

| MARS | Registers | Memory |
|---|---|---|
| OR1 01200<br>OR2 01197<br>OR3 01202<br>PR1 00081<br>PR2 01199<br>PR3 00300 | Decision—No high order dividend zero.<br>Go to step 26. | 01202 (5!3)<br>01200 (2!47!)<br>Accum. (0xxxx . . . x) |

NOTE.—Had there been a high order zero, steps 24 and 25 would have been taken. These steps effectively reduce the size of the dividend by any high order zero prior to each shift. A high order flag is added to the next digit to the right.

STEP 26

| MARS | Registers | Memory |
|---|---|---|
| OR1 01202<br>OR2 01197<br>OR3 01202<br>PR1 00081<br>PR2 01199<br>PR3 00300 | Go to step 27. | 01202 (5!3)<br>01200 (2!47!)<br>Accum. (Oxxxx . . . x) |

STEP 27

| MARS | Registers | Memory |
|---|---|---|
| OR1 01202<br>OR2 01197<br>OR3 01202<br>PR1 00081<br>PR2 01200<br>PR3 00300 | Go to step 28. | 01202 (5!3)<br>01200 (2!47!)<br>Accum. (Oxxxx . . . x) |

STEP 28

| MARS | Registers | Memory |
|---|---|---|
| OR1 01202<br>OR2 01200<br>OR3 01202<br>PR1 00081<br>PR2 01200<br>PR3 00300 | First Cycle Trigger—Set<br><br>Go to step 9. | 01202 (5!3)<br>01200 (2!47!)<br>Accum. (Oxxxx . . . x) |

Subtract—Fig. 11—Another reduction cycle is taken.

STEP 9

| MARS | Registers | Memory |
|---|---|---|
| OR1 01201<br>OR2 01200<br>OR3 01202<br>PR1 00081<br>PR2 01200<br>PR3 00300 | DRU (3)<br>MDR (3)<br>Go to step 10. | 01202 (5!3)<br>01200 (2!47!)<br>Accum. (Oxxxx . . . x) |

STEP 10

| MARS | Registers | Memory |
|---|---|---|
| OR1 01201<br>OR2 01200<br>OR3 01202<br>PR1 00081<br>PR2 01200<br>PR3 00300 | MDR (7!)<br>MAR 00377<br>Go to step 11. | 01202 (5!3)<br>01200 (2!47!)<br>Accum. (Oxxxx . . . x) |

STEP 11

| MARS | Registers | Memory |
|---|---|---|
| OR1 01201<br>OR2 01200<br>OR3 01202<br>PR1 00081<br>PR2 01200<br>PR3 00300 | MDR (4!)<br>Carry Trigger—Set<br>Go to step 12. | 01202 (5!3)<br>01200 (2!47!)<br>Accum. (Oxxxx . . . x) |

STEP 12

| MARS | Registers | Memory |
|---|---|---|
| OR1 01201<br>OR2 01199<br>OR3 01202<br>PR1 00081<br>PR2 01200<br>PR3 00300 | First Cycle Trigger—Reset<br>Decision—Subtract Not Complete.<br>Go back to step 9. | 01202 (5!3)<br>01200 (2!44!) |

STEP 9

| MARS | Registers | Memory |
|---|---|---|
| OR1 01200<br>OR2 01199<br>OR3 01202<br>PR1 00081<br>PR2 01200<br>PR3 00300 | DRU (5)<br>MDR (5!)<br>WM 1 Trigger—Set<br>Go to step 10. | 01202 (5!3)<br>01200 (2!44!) |

STEP 10

| MARS | Registers | Memory |
|---|---|---|
| OR1 01200<br>OR2 01199<br>OR3 01202<br>PR1 00081<br>PR2 01200<br>PR3 00300 | MDR (4)<br>MAR 00345<br>(Carry Trigger remains set)<br>Go to step 11. | 01202 (5!3)<br>01200 (2!44!)<br>Accum. (Oxxxx . . . x) |

STEP 11

| MARS | Registers | Memory |
|---|---|---|
| OR1 01200<br>OR2 01199<br>OR3 01202<br>PR1 00081<br>PR2 01200<br>PR3 00300 | MDR (9)<br>Go to step 12. | 01202 (5!3)<br>01200 (2!44!)<br>Accum. (Oxxxx . . . x) |

STEP 12

| MARS | Registers | Memory |
|---|---|---|
| OR1 01200<br>OR2 01198<br>OR3 01202<br>PR1 00081<br>PR2 01200<br>PR3 00309 | Decision—Subtract Not Complete.<br>Divisor Exhausted.<br>Go to step 10. | 01202 (5!3)<br>01200 (2!94!)<br>Accum. (0xxxx . . . x) |

STEP 10

| MARS | Registers | Memory |
|---|---|---|
| OR1 01200<br>OR2 01198<br>OR3 01202<br>PR1 00081<br>PR2 01200<br>PR3 00300 | MDR (2!)<br>MAR 00329<br>Go to step 11. | 01202 (5!3)<br>01200 (2!94!)<br>Accum. (0xxxx . . . x |

STEP 11

| MARS | Registers | Memory |
|---|---|---|
| OR1 01200<br>OR2 01198<br>OR3 01202<br>PR1 00081<br>PR2 01200<br>PR3 00300 | MDR (1!)<br>Carry Trigger—Set<br>Go to step 12. | 01202 (5!3).<br>01200 (2!94!)<br>Accum. (0xxxx . . . x) |

STEP 12

| MARS | Registers | Memory |
|---|---|---|
| OR1 01200<br>OR2 01197<br>OR3 01202<br>PR1 00081<br>PR2 01200<br>PR3 00300 | Decision—Subtract Complete<br>Decision—Remainder Not Minus<br>Go to step 13. | 01202 (5!3)<br>01200 (1!94!)<br>Accum. (0xxxx . . . x) |

STEP 13

| MARS | Registers | Memory |
|---|---|---|
| OR1 01200<br>OR2 01197<br>OR3 01202<br>PR1 00081<br>PR2 01200<br>PR3 00301 | Go to step 14. | 01202 (5!3)<br>01200 (1!94!)<br>Accum. (0xxxx . . . x) |

STEP 14

| MARS | Registers | Memory |
|---|---|---|
| OR1 01202<br>OR2 01197<br>OR3 01202<br>PR1 00081<br>PR2 01200<br>PR3 00301 | Go to step 15. | 01202 (5!3)<br>01200 (1!94!)<br>Accum. (0xxxx . . . x) |

STEP 15

| MARS | Registers | Memory |
|---|---|---|
| OR1 01202<br>OR2 01200<br>OR3 01202<br>PR1 00081<br>PR2 01200<br>PR3 00301 | First Cycle Trigger—Set<br>Go to step 9. | 01202 (5!3)<br>01200 (1!94!)<br>Accum. (0xxxx . . . x) |

STEPS 9, 10, 11 AND 12

| MARS | Registers | Memory |
|---|---|---|
| OR1 01201<br>OR2 01199<br>OR3 01202<br>PR1 00081<br>PR2 01200<br>PR3 00301 | (Carry Trigger—Set)<br>Decision—Subtract Not Complete.<br>Go back to step 9. | 01202 (5!3)<br>01200 (1!91!)<br>Accum. (0xxxx . . . x) |

STEPS 9, 10, 11 AND 12

| MARS | Registers | Memory |
|---|---|---|
| OR1 01200<br>OR2 01198<br>OR3 01202<br>PR1 00081<br>PR2 01200<br>PR3 00301 | (Carry Trigger—Set)<br>Decision—Subtract Not Complete<br>Divisor Exhausted<br>Go back to step 10. | 01202 (5!3)<br>01200 (1!41!)<br>Accum. (0xxxx . . . x) |

STEPS 10, 11 AND 12

| MARS | Registers | Memory |
|---|---|---|
| OR1 01200<br>OR2 01197<br>OR3 01202<br>PR1 00081<br>PR2 01200<br>PR3 00301 | (Carry Trigger—Set)<br>Decision—Subtract Complete<br>Decision—Remainder Not Minus<br>Go to step 13. | 01202 (5!3)<br>01200 (1!41!)<br>Accum. (0xxxx . . . x) |

STEPS 13, 14 AND 15

| MARS | Registers | Memory |
|---|---|---|
| OR1 01202<br>OR2 01200<br>OR3 01202<br>PR1 00081<br>PR2 01200<br>PR3 00302 | (First Cycle Trigger—Set)<br>(Carry Trigger—Reset)<br>Go back to step 9. | 01202 (5!3)<br>01200 (1!41!)<br>Accum. (0xxxx . . . x) |

STEPS 9, 10, 11 AND 12

| MARS | Registers | Memory |
|---|---|---|
| OR1 01201<br>OR2 01199<br>OR3 01202<br>PR1 00081<br>PR2 01200<br>PR3 00302 | Decision—Subtract Not Complete<br>Go back to step 9. | 01202 (5!3)<br>01200 (1!48!)<br>Accum. (0xxxx . . . x) |

STEPS 9, 10, 11 AND 12

| MARS | Registers | Memory |
|---|---|---|
| OR1 01200<br>OR2 01198<br>OR3 01202<br>PR1 00081<br>PR2 01200<br>PR3 00302 | (Carry Trigger—Set)<br>Decision—Subtract Not Complete<br>Divisor Exhausted<br>Go back to step 10. | 01202 (5!3)<br>01200 (1!88!)<br>Accum. (0xxxx . . . x) |

STEPS 10, 11 AND 12

| MARS | Registers | Memory |
|---|---|---|
| OR1 01200<br>OR2 01197<br>OR3 01202<br>PR1 00081<br>PR2 01200<br>PR3 00302 | (Carry Trigger—Set)<br>Decision—Subtract Complete<br>Decision—Remainder Not Minus<br>Go to step 13. | 01202 (5!3)<br>01200 (0!88!)<br>Accum. (0xxxx . . . x) |

STEPS 13, 14 AND 15

| MARS | Registers | Memory |
|---|---|---|
| OR1 01202<br>OR2 01200<br>OR3 01202<br>PR1 00081<br>PR2 01200<br>PR3 00303 | (First Cycle Trigger—Set)<br>(Carry Trigger—Reset)<br>Go back to step 9. | 01202 (5!3)<br>01200 (0!88!)<br>Accum. (0xxxx. . . x) |

STEPS 9-12, 9-12, 10-12, 13-15

| MARS | Registers | Memory |
|---|---|---|
| OR1 01202<br>OR2 01200<br>OR3 01202<br>PR1 00081<br>PR2 01200<br>PR3 00304 | (First Cycle Trigger—Set)<br>(Carry Trigger—Set)<br>Go back to step 9. | 01202 (5!3)<br>01200 (0!35!)<br>Accum. (0xxxx . . . x) |

STEPS 9-12, 9-12, 10-12

| MARS | Registers | Memory |
|---|---|---|
| OR1 01200<br>OR2 01197<br>OR3 01202<br>PR1 00081<br>PR2 01200<br>PR3 00304 | Carry Trigger—Reset<br>Decision—Subtract Complete<br>Decision—Remainder Minus<br>Go to step 16. | 01202 (5!3)<br>01200 (9!82!)<br>Accum. (0xxxx . . . x) |

STEP 16

| MARS | Registers | Memory |
|---|---|---|
| OR1 01200<br>OR2 01197<br>OR3 01202<br>PR1 00081<br>PR2 01200<br>PR3 00300 | MDR (4)<br>Go to step 17. | 01202 (5!3)<br>01200 (9!82!)<br>Accum. (0xxxx . . . x) |

STEP 17

| MARS | Registers | Memory |
|---|---|---|
| OR1 01200<br>OR2 01197<br>OR3 01202<br>PR1 00082<br>PR2 01200<br>PR3 00300 | Go to step 18. | 01202 (5!3)<br>01200 (9!82!)<br>Accum. (04xxx . . . x) |

STEP 18

| MARS | Registers | Memory |
|---|---|---|
| OR1 01200<br>OR2 01200<br>OR3 01202<br>PR1 00082<br>PR2 01200<br>PR3 00300 | Decision—End Divide<br>Quotient Positive<br>Go to step 30. | 01202 (5!3)<br>01200 (9!82!)<br>Accum. (04xxx . . . x) |

STEP 30

| MARS | Registers | Memory |
|---|---|---|
| OR1 01200<br>OR2 01200<br>OR3 01202<br>PR1 00082<br>PR2 01200<br>PR3 00300 | MAR 00080<br>MDR (0!)<br>Go to I-time for Next Instruction. | 01202 (5!3)<br>01200 (9!82!)<br>Accum. (0!4xxx . . . x |

The divide example thus takes slightly more than one hundred cycles. The quotient appears in the accumulator area in memory, with its high order at location 00080.

The programmer maintains surveillance over the decimal point—for a quotient carried into decimal values, he must add low order zeros to the dividend in advance or maintain program control over low order digit minus sign flags.

*Recapitulation*

The invention is a low-investment dividing computer in which operations are performed by multiple references to memory 16. Memory locations 00300–00399 contain an add table; a four-bit BCD digit and a flag denote sum and carry, respectively, of two decimal digits which make up the table address of the location. The division operation is carried out over three sequences of memory references, lineup, subtract and add back. During lineup, the dividend high order digit address is placed in OR2. The divisor high order digit address is then searched for, digit by digit, with the dividend address being incremented as each digit of the divisor is scanned. At the end of the lineup sequence, OR 1 contains the low order divisor digit address and OR2 contains the address of a partial dividend equal in order size to the divisor. During the subtract sequence, the divisor is subtracted from the partial dividend and, upon each successful subtraction, the address in the quotient digit address register PR3 is incremented. After the final successful subtraction for each order, PR3 contains the table address of the proper value quotient digit, which is produced from memory and stored in an accumulator area per PR1. On the add back sequence, the divisor is added to the dividend to maintain a positive remainder, and an effective shift is produced by incrementing OR2. The divisor and dividend are scanned at various decision levels to provide looping and the end divide decision.

CLAIMS SECTION

While the invention has been particularly shown and described with reference to a preferred embodiment thereof, it will be understood by those skilled in the art that various changes in form and details may be made therein without departing from the spirit and scope of the invention.

What is claimed is:

1. A memory-centered computer comprising:

(a) a memory having a multiplicity of distinctly addressable digit locations, each including a group of data bit storage elements and a flag bit storage element, a number of which locations are presettable to form a table of sums addressable by operand digits to be added;

(b) memory addressing means including a memory address register MOR and connections for referencing the location in memory specified by the setting in MAR;

(c) memory address register storage MARS connected to MAR, including a plurality of registers, each adapted for receiving and retaining an address indefinitely and for transferring the address to MAR on call, one of the registers being a quotient digit address register;

(d) memory readout means MDR for receiving, storing and regenerating a digit of memory;

(e) address modification means for conveying an address digit from said memory readout means to said memory addressing means and increment means connecting MAR back to MARS for regenerating and updating MARS; and (f) division timing means including—

(1) lineup means operative in response to the address of the dividend and divisor contained in respective registers of said memory address register storage and responsive to the address of corresponding orders of the dividend and divisor to correlate an effective dividend with a number of digits of a divisor, (2) subtract means operative in response to the addresses of the dividend and divisor in said MARS as presented to said MAR, and effective to transfer each digit of said dividend and the complement of said divisor to said MAR for obtaining a result from said table to make repetitive subtractions of the divisor digits from the dividend remainder digits and to develop the table address of the quotient by incrementing the address in the quotient digit address register with each subtraction of all digits of the divisor, and (3) add back means operative in response to the divisor digits and dividend remainder digits for addressing said table to add back the divisor to the dividend remainder after a subtraction has carried the dividend remainder below zero.

2. A memory-centered computer according to claim 1, wherein MARS includes divisor, dividend, quotient, accumulator and divisor initializing address registers said divisor initializing address register having the same address as the low order digit of said divisor, wherein said lineup means comprises:

(a) fixed address means to set the quotient accumulator address register to a high order quotient address and the quotient digit address register to a zero quotient digit table address;

(b) dividend high order digit location means effective to develop the address of the high order dividend digit in the dividend address register;

(c) divisor high order digit location means effective to increment the effective dividend address in the dividend address register and to decrement the effective divisor address in the divisor address register while searching for the divisor high order, thereby developing the effective address of a partial dividend of size equal to the divisor; and (d) initializing means for setting the divisor address register to the value of the divisor initializing address register.

3. A memory-centered computer according to claim 1, wherein:

an accumulator set of memory locations having an initial address are reserved for a quotient accumulator and a table set of memory locations having an initial address are presettable to form a table;

MARS includes divisor address register OR1, dividend address register OR2, divisor address initializing register OR3, quotient accumulator address register PR1, partial dividend address initializing register PR2, and quotient digit address register PR3, and said lineup means comprises first through eighth program step triggers, high order dividend decide logic, high order divisor decide logic, a first cycle trigger and a quotient negative trigger, said program step triggers being effective as follows:

trigger 1, set PR1 to the initial address of the accumulator set of memory locations, set PR3 to the initial address of the table set of memory locations, reset quotient negative trigger - - trigger 2, read out dividend digit to MDR per dividend address register, decrement OR2 - - trigger 3, set flag element of low order dividend digit - - trigger 4, increment OR2 - - trigger 5, read out divisor digit to MDR per divisor address register, decrement OR1 - - trigger 6, clear flag element of low order divisor digit - - trigger 7, set OR1 equal to OR3 - - trigger 8, set PR2 equal to OR2, set first cycle trigger; said high order dividend decide logic passes control respectively to program triggers 3 and then 2, 2 directly, or 4 upon recognition of the low order digit without flag, low order digit with flag, intermediate order digit, or high order digit, and sets said quotient negative trigger from a low order digit with flag; and said high order divisor decide logic passes control respectively to program triggers 6 and then 4, 4 directly, or 7 upon recognition of the low order digit with flag, low order digit without flag, intermediate order digit, or high order digit, and flips said quotient negative trigger from a low order digit with flag.

4. A memory-centered computer according to claim 3, in which a low order flag in a data word is a minus sign and any other flag identifies the high order digit, wherein:

said high order dividend decide logic comprises first, second, third and fourth AND circuits as follows:

first AND responsive to "no flag," step 2 and first cycle to reset the first cycle trigger and set the program step 3 trigger – – second AND responsive to the program step 2 trigger, first cycle and flag to reset the first cycle trigger, set the program step 2 trigger and set the quotient negative trigger – – third AND responsive to the program step 2 trigger, not first cycle and no flag to set the program step 2 trigger – – fourth AND responsive to the program step 2 trigger, not first cycle and flag to set the first cycle trigger and set the program step 4 trigger – – said high order divisor decide logic comprises fifth, sixth, seventh and eighth AND circuits as follows:

fifth AND circuit responsive to the program step 5 trigger, no flag and first cycle to set the program step 4 trigger and reset the first cycle trigger – – sixth AND circuit responsive to the program step 5 trigger, flag and first cycle to flip the quotient negative trigger, set the program step 6 trigger and reset the first cycle trigger – – seventh AND circuit responsive to the program step 5 trigger, not first cycle and no flag to set the program step 4 trigger – – and eighth AND circuit responsive to the program step 5 trigger, not first cycle and flag to set the program step 7 trigger.

5. A memory-centered computer according to claim 1, wherein said subtract means comprises:

(a) subtract means for controlling subtraction of the divisor from the dividend remainder;

(b) remainder minus decision logic sequentially following said subtract means for selectively passing control according to the state of the remainder, having a minus condition and a not minus condition;

(c) quotient development means responsive to the not minus condition of said remainder minus decision logic for incrementing the quotient digit address in the quotient digit address register, initializing said divisor address by transferring the contents of said divisor initializing address register to said divisor address register and returning control to said subtract program means; and (d) quotient storage program means responsive to the minus condition of said remainder minus decision logic to read out the quotient digit from the memory table per the content of the quotient digit address register and to store the quotient digit.

6. A memory-centered computer according to claim 1, wherein said add back means comprises:

(a) add means for controlling addition of the divisor to the dividend remainder;

(b) high order zero decision logic sequentially following said add means for selectively passing control according to the state of a high order digit to a first selected trigger for high order zero or to a second selected trigger for high order not zero.

7. A memory-centered computer according to claim 6, wherein;

said add means includes end add back decision logic responsive to a final add back trigger and flags denoting high order digits to set an initial add back trigger for no flags, – – a secondary trigger for a high order flag with said divisor digit only, – – and to condition the high order zero decision logic for both flags; and said high order zero decision logic includes zero detection logic connected to MDR to set said first selected trigger upon zero detection or said second selected trigger upon not zero detection.

8. In a computer having means for storing a divisor and a dividend remainder:

(a) an addressable memory having an add table of sums locatable by a table address including the digits to be added;

(b) an address register for accessing locations in said memory;

(c) zero address means to set said address register to an initial value related to the add table sum zero;

(d) subtraction means to subtract the divisor from the dividend remainder repetitively;

(e) quotient digit address development means responsive to said subtraction means to increment the setting of said address register for each subtraction resulting in a positive remainder;

(f) timing means for controlling in sequence the operation of means (a–e); and (g) quotient digit development means responsive to said timing means and to the current setting of said address register (b) to readout the quotient digit from said add table.

9. In a memory-centered computer having means for storing a divisor and a dividend remainder:

(a) an addressable memory having an add table of sums locatable by an address including the digits to be added;

(b) an address register for accessing locations in said memory;

(c) quotient digit address developing means for incrementing by 1 the value in said address register;

(d) subtract program means to subtract the divisor from the dividend remainder;

(e) subtract complete decision means associated with said subtract program means to signal completion of the subtraction of divisor from dividend remainder;

(f) remainder minus decision means associated with said subtract complete decision means for producing remainder negative and remainder positive signals;

(g) means responsive to a positive signal from said remainder minus decision means to energize said quotient digit address developing means to increment the setting of said address register; and (h) quotient digit development means responsive to said remainder negative signal from said remainder minus decision means and to the current setting of said address register to readout from said add table the quotient digit.

References Cited by the Examiner

UNITED STATES PATENTS 2,932,450 4/1960 Knight et al. -------- 235—159

OTHER REFERENCES

Publication I, IBM RAMAC 305, Technical Manual, copyright 1957.

Publication II, Grabbe, Ramo, and Wooldridge, "Handbook of Automation, Computation and Control," (John Wiley and Sons, Inc., 1959, N.Y.) vol. II, chapters 2 and 3, particularly pages 2–142 and 3–09, relied on.

Publication III, Maclean and Aspinall, "Decimal Adder Using a Stored Addition Table," Proceedings of Institute of Electrical Engineers, vol. 105, No. 20, March 1958, pages 129 to 135.

ROBERT C. BAILEY, *Primary Examiner.*

WALTER W. BURNS, Jr., MALCOLM A. MORRISON, *Examiners.*